United States Patent
Johnson et al.

(10) Patent No.: US 8,621,214 B2
(45) Date of Patent: *Dec. 31, 2013

(54) DOCUMENT ENCRYPTION AND DECRYPTION

(75) Inventors: Michael E. Johnson, Jackson, MI (US); Kenneth L. Wilson, Albion, MI (US)

(73) Assignee: Securencrypt, LLC, Jackson, MI (US)

( * ) Notice: Subject to any disclaimer, the term of this patent is extended or adjusted under 35 U.S.C. 154(b) by 178 days.

This patent is subject to a terminal disclaimer.

(21) Appl. No.: 12/931,770

(22) Filed: Feb. 10, 2011

(65) Prior Publication Data

US 2012/0036358 A1 Feb. 9, 2012

Related U.S. Application Data

(60) Provisional application No. 61/337,744, filed on Feb. 10, 2010.

(51) Int. Cl.
*G06F 21/00* (2013.01)

(52) U.S. Cl.
USPC ............... 713/168; 709/204; 709/219; 705/6; 705/57; 726/29; 726/34; 370/352

(58) Field of Classification Search
USPC ........................................................ 713/168
See application file for complete search history.

(56) References Cited

U.S. PATENT DOCUMENTS

| | | | |
|---|---|---|---|
| 8,060,389 B2* | 11/2011 | Johnson | 705/6 |
| 2003/0140121 A1* | 7/2003 | Adams | 709/219 |
| 2006/0075228 A1* | 4/2006 | Black et al. | 713/167 |
| 2006/0143132 A1* | 6/2006 | Valenti et al. | 705/57 |
| 2006/0165060 A1* | 7/2006 | Dua | 370/352 |
| 2006/0212698 A1* | 9/2006 | Peckover | 713/151 |
| 2007/0038857 A1* | 2/2007 | Gosnell | 713/165 |
| 2007/0130255 A1* | 6/2007 | Wolovitz et al. | 709/204 |
| 2008/0134347 A1* | 6/2008 | Goyal et al. | 726/29 |
| 2009/0119672 A1* | 5/2009 | Bussard et al. | 718/104 |
| 2009/0177800 A1* | 7/2009 | Gidron et al. | 709/248 |
| 2010/0100972 A1* | 4/2010 | Lemieux et al. | 726/34 |
| 2011/0084797 A1* | 4/2011 | Narayanan | 340/5.51 |
| 2011/0145564 A1* | 6/2011 | Moshir et al. | 713/154 |

OTHER PUBLICATIONS

Trusted Platform Module (TPM) based Security on Notebook PCs|http://ogobin.de/Tcpa/Trusted_Platform_Module_White_Paper.pdf|Sundeep Bajikar|June 20, 2002|pp. 1-20.*

* cited by examiner

*Primary Examiner* — Mahfuzur Rahman
(74) *Attorney, Agent, or Firm* — Warn Partners, P.C.

(57) ABSTRACT

A document encryption and decryption system for selectively encrypting and decrypting files and any other items and method for same to protect or secure its contents by helping to prevent unauthorized individuals from viewing data in human-perceivable or readable form. The encryption system includes remote authentication to verify a user's credentials stored on a remote database hosted by a web server. The encryption system further includes remote delete to automatically delete encrypted items stored on the user's computer, handheld or portable device, smartphone, and any other computing device of any kind when it logs onto a network if the user's computer or computing device is reported lost, stolen, or otherwise compromised. Decryption keys allow selective decryption of encrypted items that are on the computer or computing device of any kind. A Windows Communication Foundation service helps with authenticating the users with the encryption key and login process stored and processed by the web server.

4 Claims, 16 Drawing Sheets

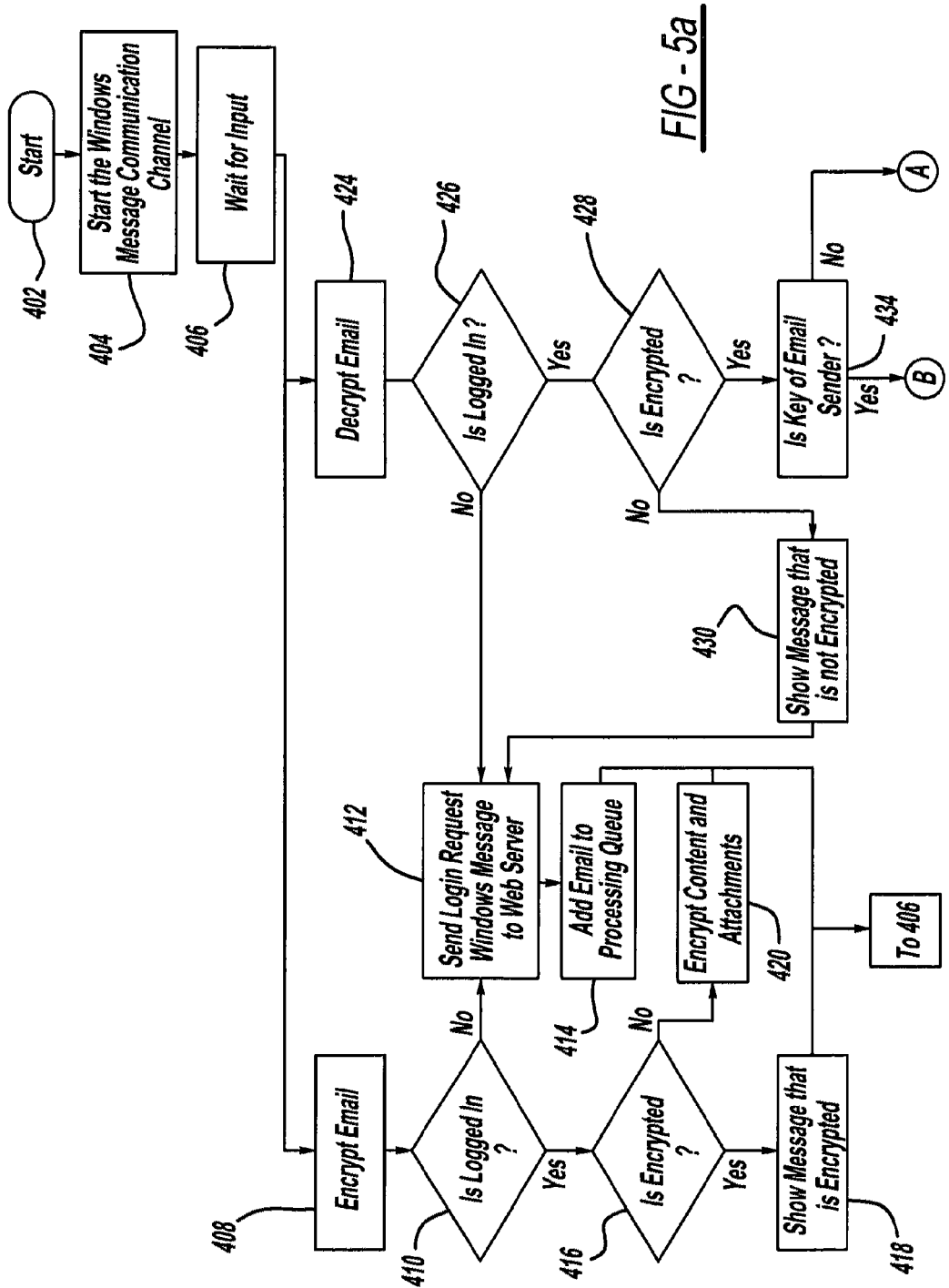

DOCUMENT ENCRYPTION AND DECRYPTION

CROSS-REFERENCE TO RELATED APPLICATION

The instant application claims priority to U.S. Provisional Patent Application Ser. No. 61/337,744, filed Feb. 10, 2010, the entire specification of which is expressly incorporated herein by reference.

FIELD OF THE INVENTION

The present invention relates to an encryption system for encrypting and decrypting files and method for same.

BACKGROUND OF THE INVENTION

In known types of encryption typically used to mask data files to confidentially transfer data over an internet and/or to store data, e.g., store on a personal computer, an encryption key is used to encrypt the data file in an attempt to protect its contents from view by an unauthorized individual. In typical encryption of data is used to decrypt the data file allowing the decrypting person to then access and view the contents of the data file. Such prior art encryption typically has an application downloadable from a website to a personal computer.

One common problem with known encryption and decryption is that it is difficult and time consuming for a user to install, requires training, is not easily implemented, and is typically cumbersome to use, typically requiring several steps in order to encrypt a data file, e.g., 4-5 steps to navigate using the computer's mouse when attempting to set up for encryption/decryption and/or to encrypt/decrypt the file itself.

Another common problem with conventional encryption applications is that the authentication data, e.g., password(s), name, address, secret answer, and the like, are stored on the user's personal computer allowing for a computer hacker or other unauthorized or malicious individual to break the protection and have access to the user's credentials. For example, a malicious person could try to obtain credentials by using back door hacking methods bypassing or otherwise overcoming any firewalls and other security protections, and to decrypt the data files. Typical encryption also does not help to prevent such unauthorized individuals from embedding the key thereby allowing unauthorized access to the data file. In addition, it is also well known that any protection algorithm can be broken in a certain amount of time, e.g., time can vary from hours to years and thousands of years. Thus, security features like computer logins can be ineffective.

Yet another common problem is that the encryption key and decryption key is not associated or tied to the particular user's computer itself allowing for an unauthorized individual to hack into the data files remotely using another computer and without having been sent the decryption key and/or password from the encrypting user. Typical known encryption also does not allow for remote deletion of encrypted files when the user's personal computer or laptop computer is lost or stolen. This presents a serious security risk to personal information stored on the lost or stolen computer. For example, it is well reported that employees in the public and private sector have had laptops stolen which held social security numbers and other highly personal and confidential information potentially resulting in large risks to individuals, national security, and the like.

Another common problem with typical encryption is that it does not automatically re-encrypt a data file upon a user closing out of the data file allowing its contents to be viewed by an unauthorized individual, e.g., by computer hacking remotely in a wireless communication environment.

Accordingly, there exists a need to develop an affordable encryption system that is more effective, easier to use, provides secure user authentication, and automatic remote deletion of files.

SUMMARY OF THE INVENTION

In accordance with the present invention an encryption system and method for encrypting and decrypting any type of file to protect or secure its contents by helping to prevent unauthorized individuals from viewing data in human-perceivable or readable form. In the event that a hacker or other unauthorized party tries to access information on a computer, they will not be able to easily view or read the encrypted information. It will appear to them as a jumbled series of letters, numbers and symbols. Thus, encrypted information can be useless to any intruder who is after personal, sensitive, and/or private information. A decryption key allows encrypted files stored and/or emailed or otherwise transmitted to be selectively decrypted.

Even with anti-virus in use, the encryption system user would further benefit from the security of encryption to help protect information in the case of theft, hackers, and/or sabotage. This is because anti-virus protects the computer from viruses, but does nothing to prevent hackers and the like from accessing the user's information, or to help prevent anyone from stealing or sabotaging the computer files.

The encryption system comprises at least one computer, at least one computer operating system, at least one application, at least one program (e.g., encryption based software) usable by person(s) with even basic computer skills, and at least one encryption system web server. The encryption system includes a program in dot.net, C++, SQL and the like to interact with any computer operating system. Utilizing a combination of links, ribbons, and user friendly designs, the encryption system has improved usability, e.g., the encryption system can allow an easier true "one-click" encryption, than conventional encryption. The encryption system has "Plug-ins" for applications in the Microsoft Office Suite. It is understood however, that "Plug-ins" for other applications can be used, including Macintosh and the like. Thus, the encryption system, can include plug-ins, e.g., Microsoft Office Suite plug-ins and Internet Explorer (IE) ActiveX, and the like, and encrypts files directly from the application, e.g., Word, PowerPoint, Excel, Outlook, and the like, and can be compatible with various operating systems, e.g., Microsoft Office 2003, 2007, 2010, Windows Mobile, Macintosh, Windows Internet Explorer, BlackBerry™ OS, Android™ OS, and the like. The encryption system also includes remote authentication to verify a user's credentials registered to the user's computer stored in a remote database on a host server or web server. The encryption system further includes remote delete to automatically delete encrypted files stored on or otherwise tied to the user's computer when the computer is connected to the internet if the user reports the computer as lost or stolen.

Once the exclusive "Remote Delete" feature for the personal computer, laptop computer, smartphone and the like is activated, remote delete will delete all encrypted files from a hard drive or storage device immediately upon connection to the internet. Thus, the remote delete allows the user to delete all encrypted files from their computer in the event that the computer is lost or stolen.

The remote authentication process helps to defend a user's log-in from "password cracking". There are many inexpensive password cracking programs available to anyone that can defeat a password stored on a computer. The encryption system can help secure and protect a user's log-in credentials by storing all credentials remotely on the secure web server, e.g., log-in username, password, computer serial number, encryption key, and any combination thereof, all stored remotely on the web server. Additionally, the encryption system security can be enhanced by the user having to be logged into the same computer that they installed the application on, connect to the encryption system web server, authenticate the application, and apply a user created password to access encrypted documents and emails. Remote authentication can require that the user authenticate their user account with the encryption system web server whenever they log into the application.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5a is a schematic illustration of a portion of a flowchart illustrating primary processing steps of an electronic mail encryption and decryption system, in accordance with another embodiment of the present invention;

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, encryption used herein includes encryption that allows for selectively converting, sending and/or storing encrypted files to protect or secure the file contents by helping to prevent unauthorized individuals from viewing files in human-perceivable or readable form. Decryption used herein included decryption that allows for selectively decrypting files to be viewed in human-perceivable or readable form. The description herein assumes a basic understanding of encryption and decryption by the reader.

It is understood that the term "file" used herein includes, but is not limited to, any type of file, folders, documents, data, plaintext, electronic mail ("emails"), attachments, music, photos, digital images, videos, graphics, scanned items, spreadsheets, displays, personal information, contact lists, directories, confidential or privileged information, text messages, mobile phone messages, calendars, notebooks, and any other file of any kind, and combinations thereof. Additionally, it is understood that any operating environments, and/or systems, and/or configurations described herein in which the invention may be implemented is not intended to limit the invention, its application, or uses and that other computing systems, environments and/or configurations may be used. The term "computer" can include any type of computer including, but not limited to, personal computers, laptop computers, handheld or portable devices such as smartphones, e.g., Droid™, BlackBerry™, Nokia™, and HTC™, mobile phones, portable media players, portable gaming consoles, Global Positioning Units (GPS), and any other computing device of any kind are all contemplated.

Figure 1:
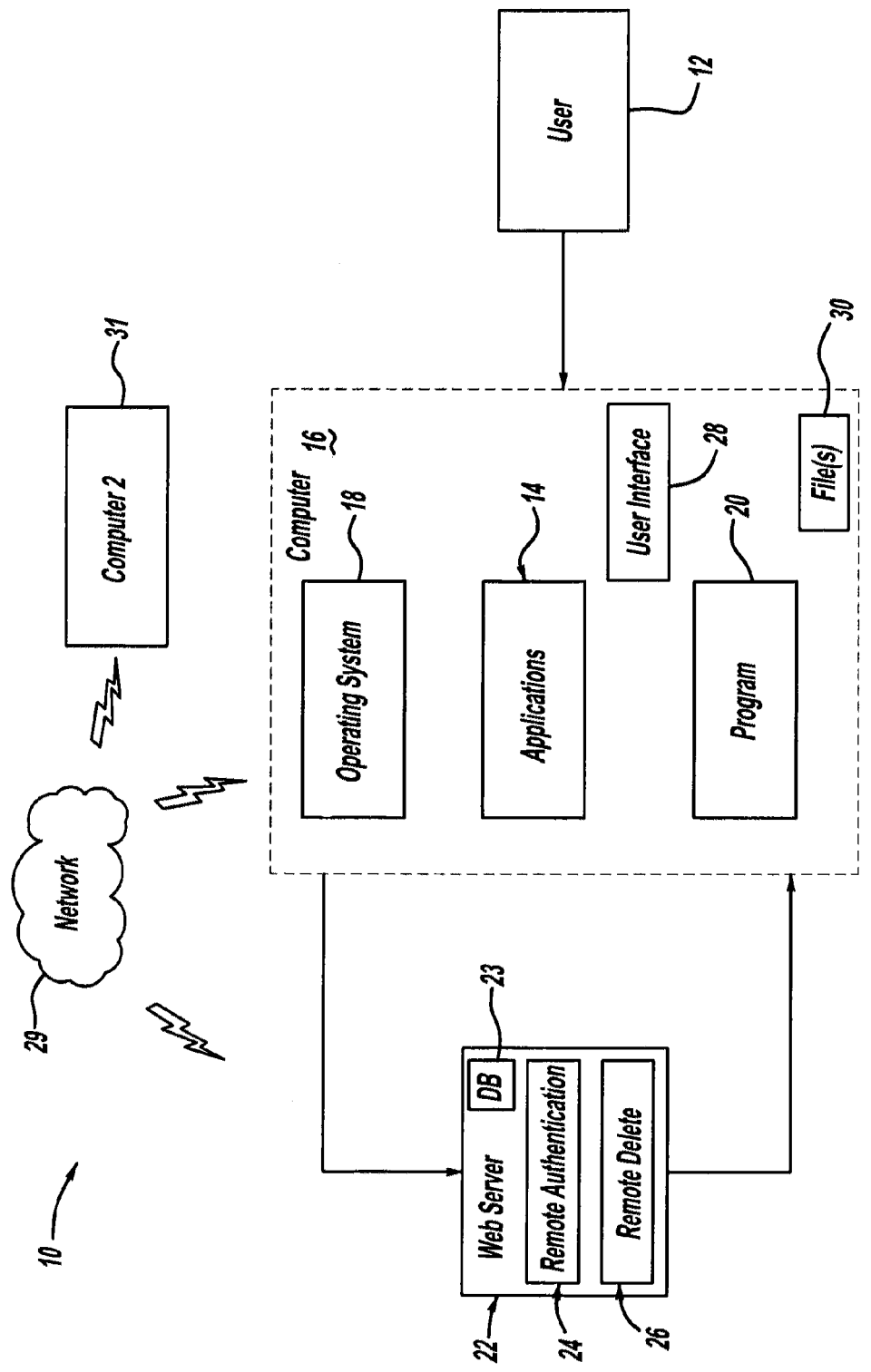
FIG. 1 is a schematic block diagram illustrating an exemplary encryption system network environment that may be used to implement certain embodiments of the invention.

FIG. 1 is a schematic block diagram illustrating an exemplary encryption system network environment, generally shown at 10, in which certain embodiments of the invention can be implemented, and including a computer that may be used to implement certain embodiments. The encryption system 10 comprises at least one computer, shown generally at 16, having at least one application, shown generally at 14, e.g., Microsoft Word, at least one computer operating system 18, e.g., Microsoft Windows, at least one program 20, and further includes at least one web server, shown generally at 22. The web server 22 includes at least remote authentication, shown generally at 24, and remote deletion, shown generally at 26, to implement user credential authentication and automatic file deletion. The user 12 generates and/or opens and inputs information into the application 14 creating a new or amended file 30 that can be stored, e.g., inputting plaintext into a Microsoft Word document for storage on the computer 16 hard drive, a removable flash drive, shared network, and the like.

Optionally, redundant backup web servers 22 and/or redundant internet connections can be used to help ensure a user 12 can log-in at anytime for remote authentication and performing encryption and decryption. It is further understood that the web server 22 can typically include additional components or elements, e.g., processors, processing units, network connections, control circuitry, routers, hard drive and/or storage device(s), database(s), hardware, software, and the like, and that these additional components or elements have been omitted from FIG. 1 so as to not clutter the drawing. It is understood that the computer 16 typically includes additional components, e.g., processors, processing units, monitors, network connections, e.g., for connecting to Internet, local area network, and/or intranet, USB ports, BUS, user interfaces/input devices, hard drive and/or storage device(s), flash drives, and the like, can execute Web browsers, e.g., Windows Internet Explorer, and that these additional components have been omitted from FIG. 1 so as to not clutter the drawing. A user interface 28 can comprise any input component such as touch screens, buttons, mice, keyboards, and any other graphical user interface and combinations thereof.

The program 20 can obtain and transmit predetermined credentials, e.g., identification numbers of the personal computer associated with the program 20 and of the user 12, via a network 29 such as the internet to the web server 22 for remote authentication and/or remote deletion of encrypted files using wireless or wired communication or any other type of data communication network. If the user 12 credentials and computer 16 are authenticated, e.g., the computer 16 identification matches with what is pre-registered for a specific user 12 in at least one web server 22 database ("DB") 23, the user 12 can selectively encrypt, decrypt, and/or open the file 30, as will be explained in greater detail below. Encrypting the file 30 transforms the file 30 contents into a series of letters, numbers, symbols, and/or combinations thereof that is not human-perceivable or readable to help secure its content from an unauthorized party. Any encrypted files 30 on the computer 16 remains unperceivable until decrypted. Decrypting the file 30 transforms the file 30 contents back into readable or perceivable form. Additionally, any previously encrypted file 30 can be automatically re-encrypted upon the user 12 closing out of the file 30 and/or logging off which helps to protect its contents from an unauthorized party, e.g., helps protect against computer hacking remotely in a wireless communication environment.

Any encrypted files 30 on the computer 16 remain unreadable or unperceivable until decrypted even if the computer 16 is lost, stolen, or otherwise compromised. If the user 12 reports the computer 16 as lost or stolen, the encrypted files 30 will automatically be deleted remotely via remote delete 26 when the computer 16 is first connected to the internet, thereby helping to prevent encrypted files from ever being seen or read by a thief or other undesired party.

Additionally, the user 12 can optionally selectively send encrypted files 30 to at least a second user's computer 31, e.g., sending an email and/or text message to another person's email address and/or phone number accessible on any computer 31 via the network 29, and the receiving party can selectively decrypt the file 30 contents into readable or perceivable form using an authorized key to decrypt. The second computer 31 can be any computer type, e.g., typically includes any computer or computing device type as set forth above relative to computer 16 and typically substantially includes at least the components or elements set forth above relative to the computer 16. While two computers 16,31 are illustrated, it is understood that fewer or greater than two can be used.

Referring to the figures generally, the program 20 can be formed in dot.net, C++, SQL and the like frameworks operable to be compatible with and interact with any computer operating system 18, e.g., Microsoft Windows 7, XP, Vista and 2003, Windows Mobile, BlackBerry® OS, Android® OS, and the like, and to selectively perform functions. By way of non-limiting example, the encryption system 10 has "Plug-ins", for applications 14 in the Microsoft Office Suite and the like, e.g., such as Microsoft Office, Microsoft Word, Microsoft Excel, WinZip, Microsoft PowerPoint, Microsoft Access, Microsoft Outlook, Windows Internet Explorer ActiveX, and the like, to perform encryption and decryption of files. It is understood however, that plug-ins for other applications can be used, e.g., Adobe, Photoshop, QuickTime, media players, Acrobat Reader, Intuit QuickBooks, and the like.

The program 20 can utilize up to at least about Advanced Encryption Standard (AES) 512-bit encryption, e.g., at least AES 256-bit robust encryption, and can include a "box product" physically inserted into the computer 16 to load onto a user's 12 computer and/or downloadable from a network such as the internet.

If the user 12 obtains a new computer 12, it is understood that the user 12 can transfer all of the encrypted files to a new computer 16 and decrypt them using the user's 12 original account and password. The user 12 can also have at least two computers 16 tied to the user's 12 account allowing encryption/decryption of files 30 from numerous computers 16 using identical authentication credentials, e.g., username, password, and the like.

Figure 2A:
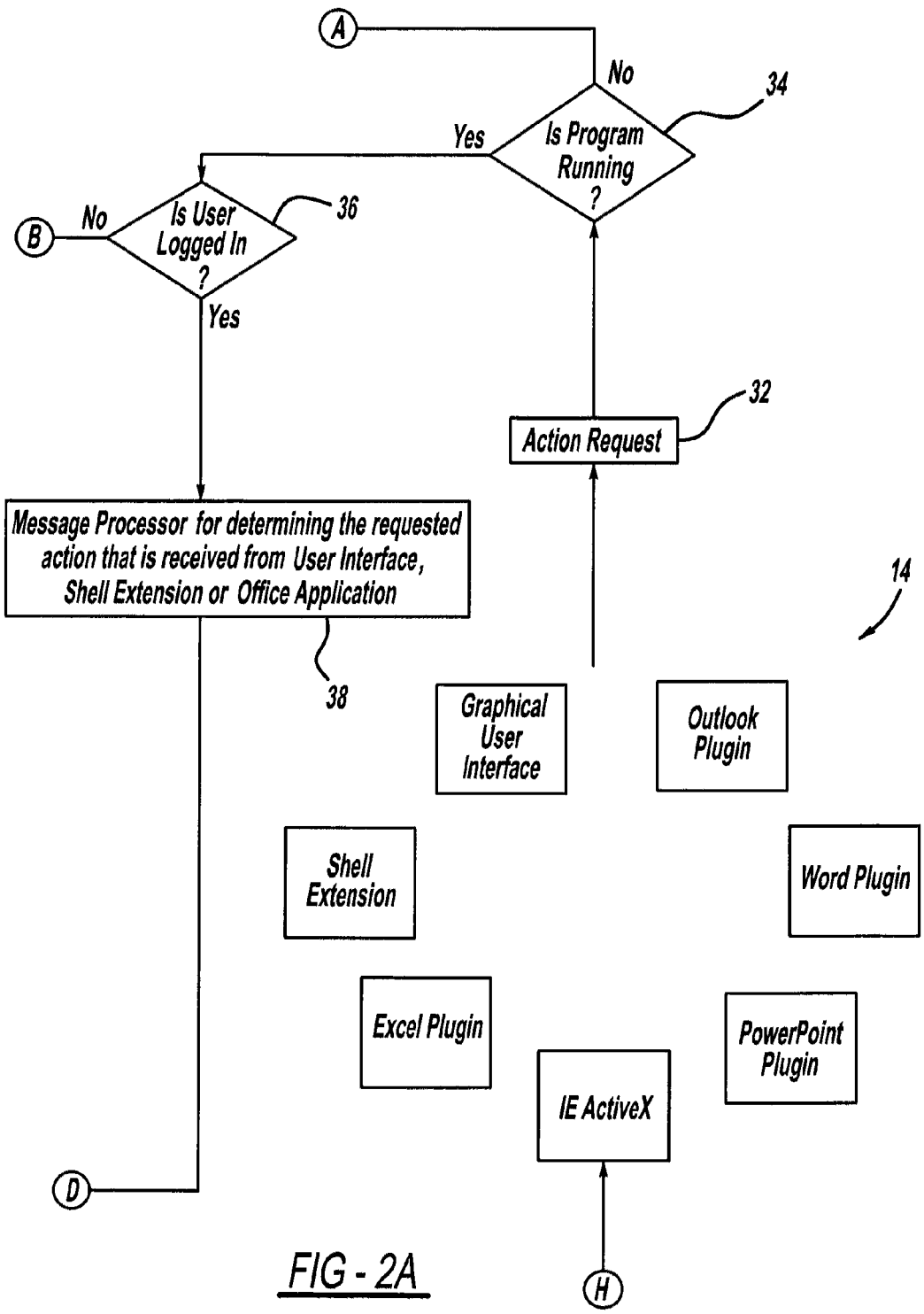
FIG. 2A is a schematic illustration of a portion of a flowchart illustrating primary processing steps of the encryption system, in accordance with the present invention.
Figure 2B:
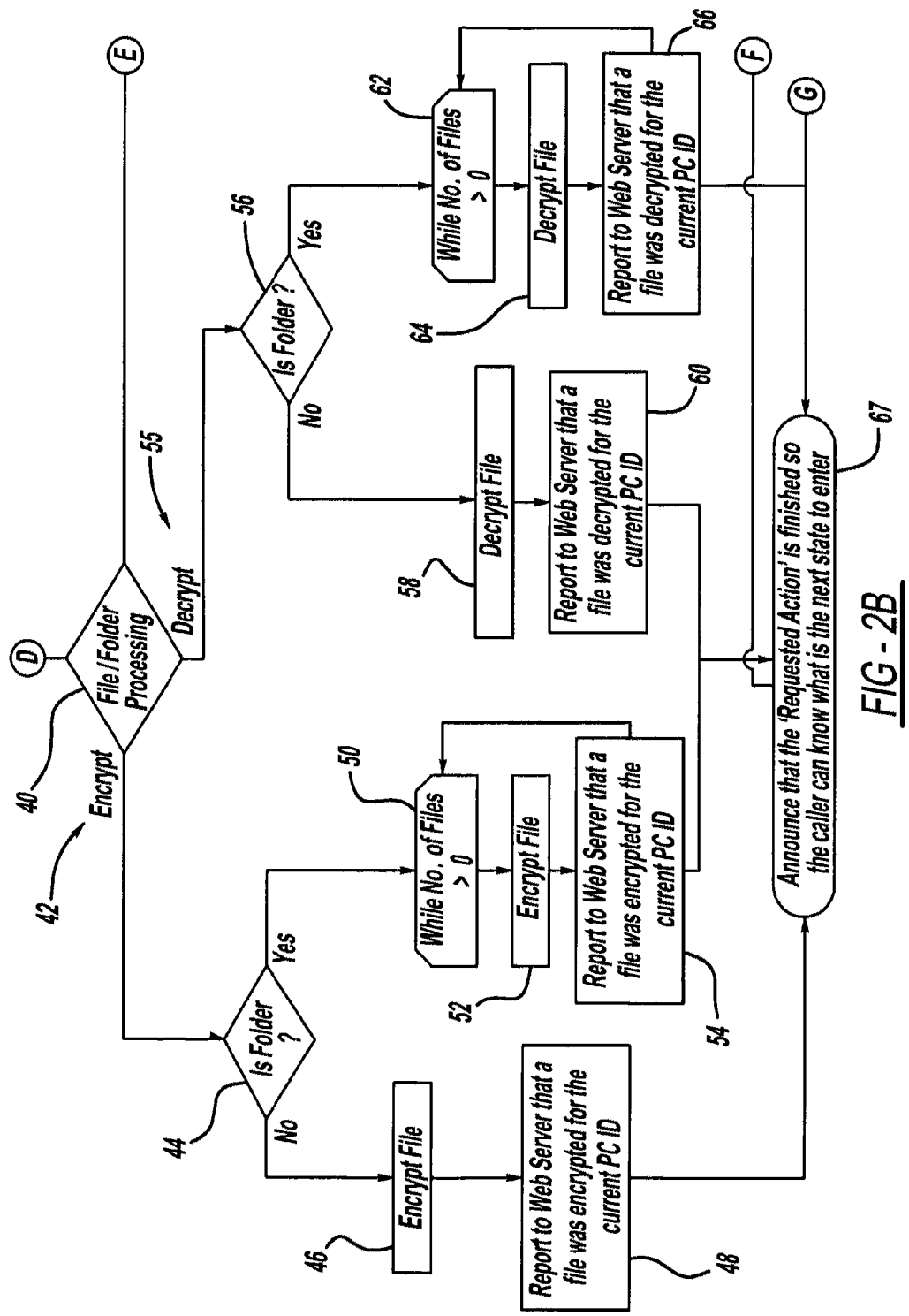
FIG. 2B is a schematic illustration of a portion of a flowchart illustrating primary processing steps of the encryption system, in accordance with the present invention.
Figure 2C:
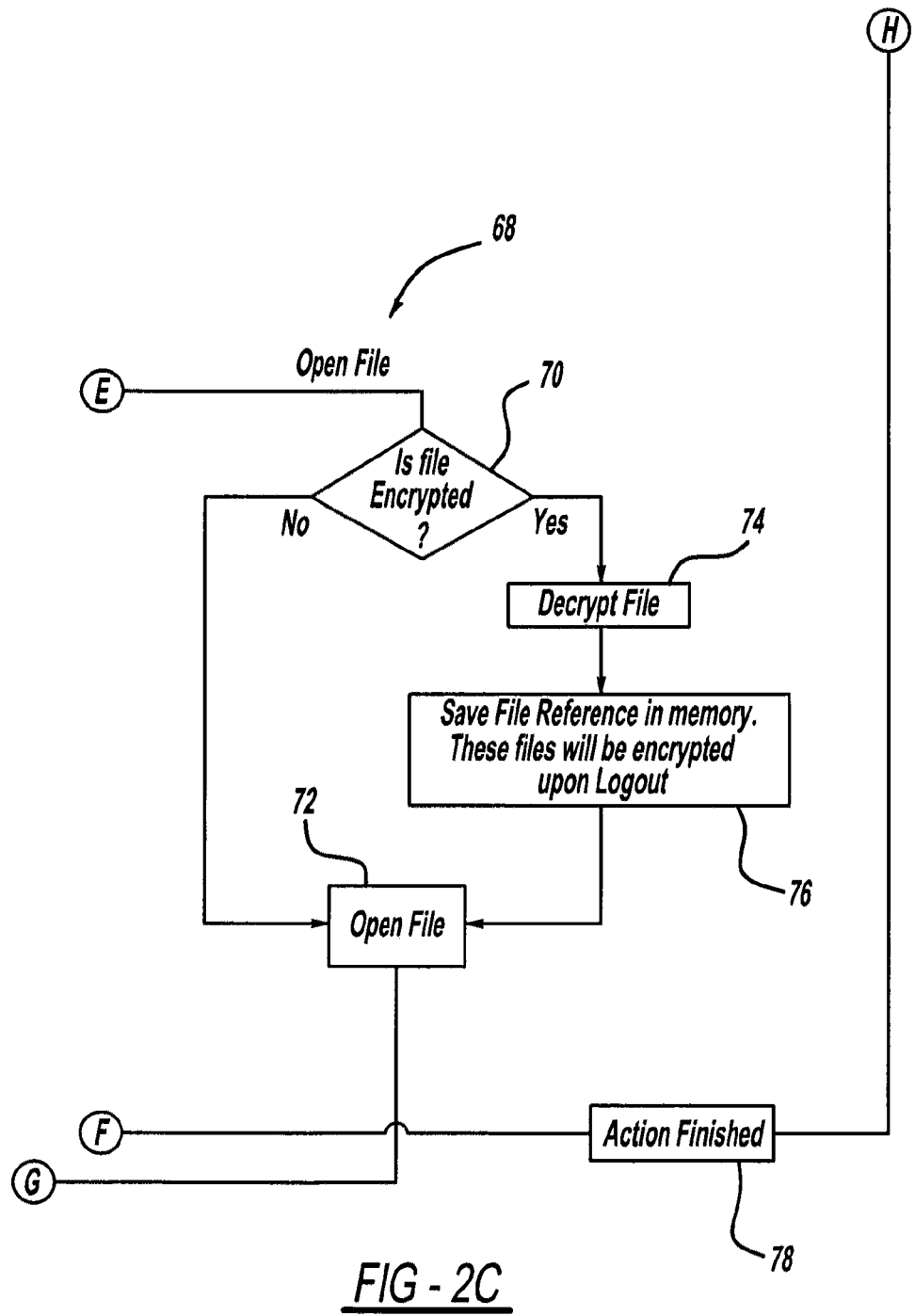
FIG. 2C is a schematic illustration of a portion of a flowchart illustrating primary processing steps of the encryption system, in accordance with the present invention.

Referring to FIGS. 2A to 2E generally, and more particularly to FIGS. 2A to 2C, there is depicted a portion of a flowchart illustrating the steps performed for encrypting and/or decrypting files, in accordance with certain embodiments. The operations illustrated can be implemented in at least the computer 16 environment of the encryption system 10. There are depicted various types of application 14 plug-ins, e.g., Word, Outlook, shell extension(s), Internet Explorer ActiveX, that can be in data communication with a graphical user interface (GUI). Information and actions available to the user 12 can be through graphical icons, visual indicators, and the like. When an action is requested (at block 32), it must be determined whether or not the program 20 is running at first act 34. It is understood that the requested action can originate from the program interface, shell extension, and/or Office application, and the like. If the program 20 is running at first act 34 and the user 12 is logged in at second act 36, then a message processor 38 determines the requested action that is received from the program user interface, shell extension(s), and/or Office application(s). The file 30 can be processed by encrypting it, decrypting it, and/or opening an unencrypted file (See FIGS. 2B and 2C).

For file processing (at block 40), the user can request encryption, decryption, and/or opening an unencrypted file. When the user's 12 requested action is encryption, shown generally at 42, if the file 30 is not determined to be a folder (at act 44), e.g., is not a folder containing greater than one file therein, the file is encrypted (at block 46). A report 48 is sent to the web server 22 confirming that the file 30 was encrypted for that computer identification ("ID"), e.g., computer serial number, to which the user 12 is logged-in (login is associated) and an announcement that the requested action is finished and the next state to enter is made (at act 67). If the file 30 is determined to be a folder (act 44) and while the number of files are determined to be greater than zero (at act 52), each file 30 in the folder will be encrypted (at block 52). A report 54 is sent to the web server 22 confirming that the files 30 were encrypted for that computer ID and an announcement that the requested action is finished and the next state to enter is made (act 67).

For file processing (at block 40), if the user's 12 requested action is decryption, shown generally at 55, and if the file 30 is not determined to be a folder (at act 56), e.g., is not a folder containing greater than one file therein, the file is decrypted (at block 58). A report 60 is sent to the web server 22 confirming that the file 30 was encrypted for that computer ID and an announcement that the requested action is finished and the next state to enter is made (act 67). If the file 30 is determined to be a folder (at act 56) and while the number of files are determined to be greater than zero (at act 62), each file 30 in the folder will be decrypted (at block 64). A report 66 is sent to the web server 22 confirming that the files 30 were encrypted for that computer ID and an announcement that the requested action is finished and the next state to enter is made (act 67).

For file processing (at block 40), if the user's 12 requested action is to open a file, shown generally at 68 in FIG. 2C, and if the file 30 is not determined to be encrypted (at act 70), the file 30 is opened (at act 72) allowing the user 12 to read its contents and work with and/or save down the file unencrypted and/or request encryption. If the file 30 is determined to be encrypted (act 70), the file 30 will be decrypted (at block 74). The file reference will be saved in the memory (at act 76) and the file 30 can be encrypted upon the user 12 logging out. The file 30 is opened (act 72) allowing the user 12 to read its contents and work with the file 30, and an announcement that the requested action is finished and the next state to enter is made (act 67). The computer user's 12 request that a file 30 be processed is finished (at block 78).

By way of non-limiting example, the user 12 can input number and letter characters and calculations into a Microsoft Excel document and click on an encryption key operably disposed in a toolbar or dropdown menu to request or command that the file 30 be encrypted to help mask the data from being viewable by an undesired party. Preferably, the encryption key is a "one-click" to encrypt key. Another example is a user 12 creates a new email message in Outlook and requests encryption, preferably with a "one-click" to encrypt key, prior to sending. Another example is a user 12 creating a smartphone message, e.g., on a Droid™, and requests encryption, preferably with a "one-click" to encrypt touch screen button. Yet another non-limiting example is a registered party receives an encrypted email and clicks a decrypt key to decrypt its contents, preferably with a "one-click" to decrypt key.

Figure 2D:
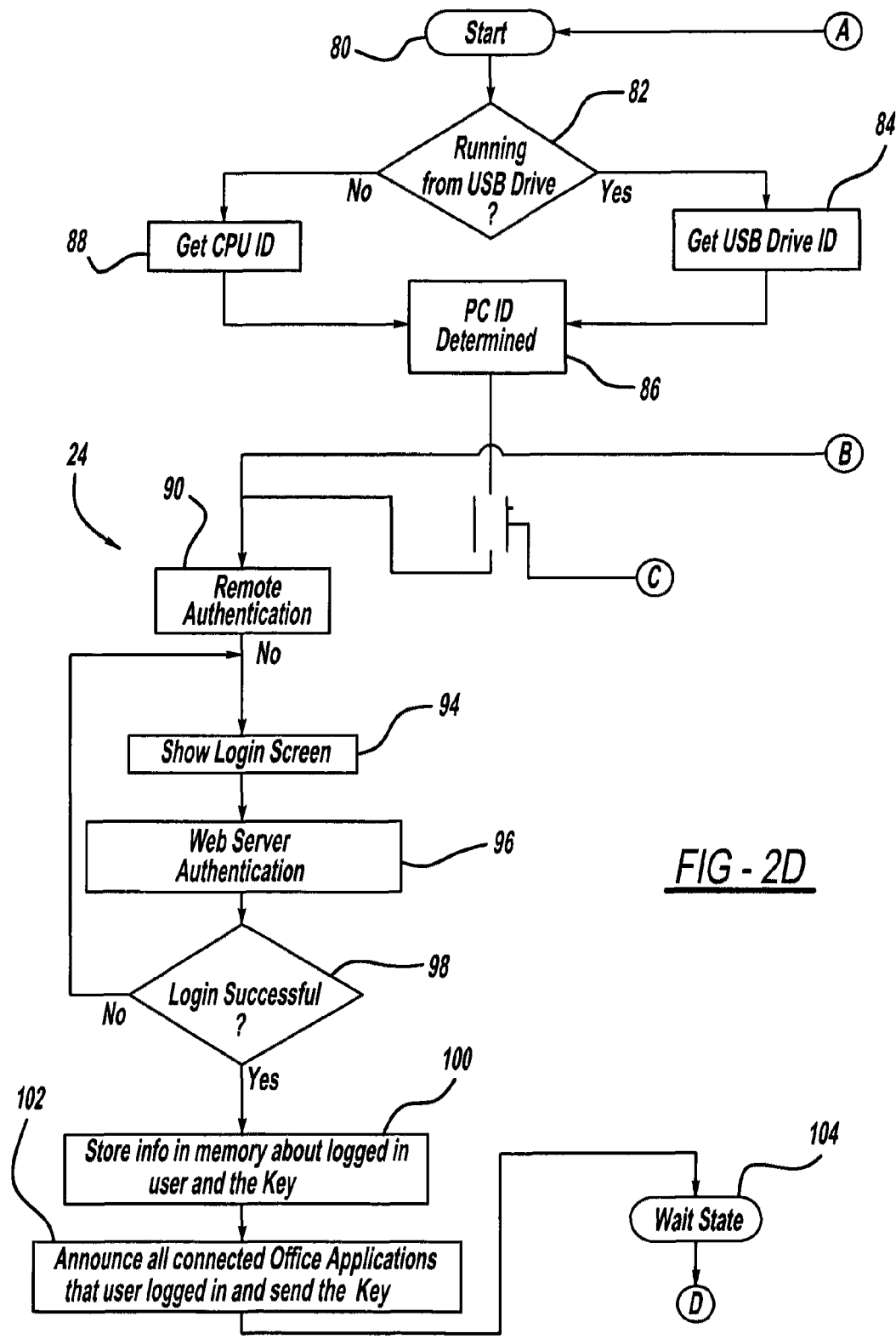
FIG. 2D is a schematic illustration of a portion of a flowchart illustrating primary processing steps of the encryption system, in accordance with the present invention.
Figure 2E:
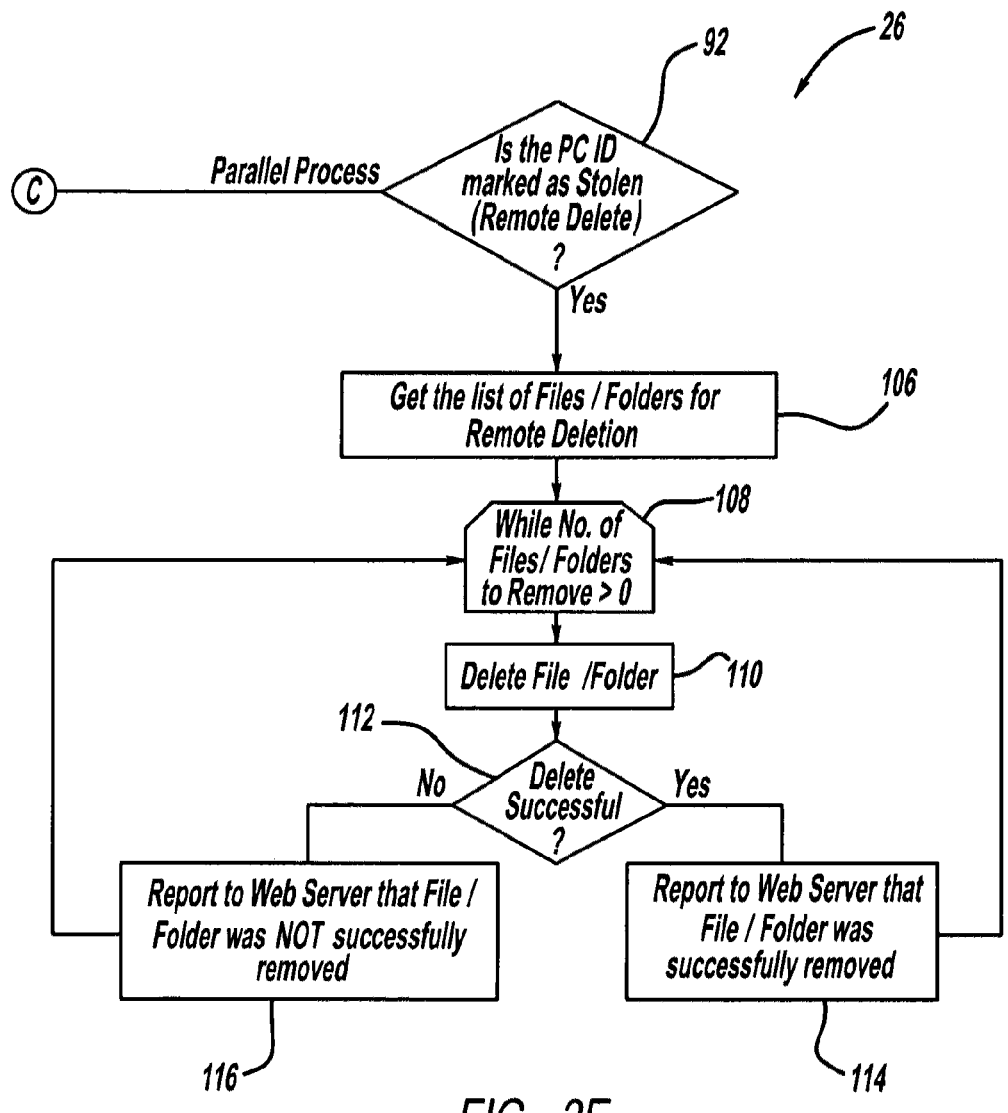
FIG. 2E is a schematic illustration of a portion of a flowchart illustrating primary processing steps of the encryption system, in accordance with the present invention.

Referring to FIGS. 2A to 2E generally, and more particularly to FIGS. 2D to 2E, there is depicted a flowchart illustrating the steps performed for remote authentication 24 and remote deletion 26 for authenticating credentials prior to encrypting/decrypting and/or deleting files 30 if the computer 16 is reported lost or stolen, implemented in the encryption system 10. If the program 20 was determined not to be running (first act 34 shown in FIG. 2A), the program 20 can be started (at block 80) by first determining whether the program 20 is running from a universal serial bus (USB) (at act 82). If it is running from the USB drive, the USB drive identification is retrieved (at act 84) and the computer 16 identification is determined (at act 86). If it is not running from the USB drive, the central processing unit (CPU) identification is retrieved (at act 88) and the computer 16 identification is determined (at act 86). Once the computer 16 identification is determined (act 86), e.g., computer serial numbers and the like automatically obtained, parallel processes implement the remote authentication 24 and remote deletion 26. Additionally, the user 12 must be logged-in to open and/or view encrypted files 30 and to decrypt. Thus, if the user 12 is not determined to be logged-in (act 36 shown in FIG. 2A) the remote authentication 24 and remote deletion 26 processes are entered (starting at blocks 90 and 92 respectively).

A remote authentication login screen 94 allows the user 12 to enter the authentication user credentials and the web server 22 authenticates the entry (at act 96), e.g., matches entered credentials with stored credentials on the web server 22 database. It is understood that authentication can require that at least the computer identification that was determined (act 86) correspond with the user credentials entered by the user 12 on the login screen 94, e.g., user credentials and computer identification matches stored credentials on the web server 22 database. If it is determined that the login was not successful (at act 98), the user 12 is directed back to the login screen 94. If the user 12 logs-in on the login screen 94 using the user's 12 credentials and the web server 22 authenticates the information using the database (at 96), the login can be determined to be successful (act 98) and the logged in user 12 and key information, e.g., encryption key and/or decryption key, can be stored in the memory (at act 100). The user 12 is notified of all connected applications 14, e.g., Office Applications, that the user 12 logged in and the web server 22 sends the user 12 the key (at act 102). It is understood that user credentials can include personal information, name, address, secret answer, password(s), and the like.

It is understood that an optional 'Remember me' feature can be used, as will be explained in greater detail below (shown in FIG. 3), which can save the user's 12 credentials and use them for a set time, e.g., 'Remember me' for the current day. The credentials together with the login date are encrypted and can be stored in a registry. For the same credentials, the program 20 can generate different encrypted strings based on the moment when the login is performed, which makes it more difficult for a hacker to determine the encryption algorithm. Preferably, the 'Remember me' credentials and login date and/or time are held remotely on the web server 22.

The user authentication/authorization decision can be taken on the web server 22 side and the communication between the program 20 and the web server 22 is encrypted. Another important protective benefit is that the web server authentication (act 96) database is only accessible from the server/network where it resides, so it helps to prevent being broken into by outside hackers due to its isolation. Additionally, the encryption system 10 helps to protect the user's 12 credentials/personal data because the web server authentication (act 96) database is hosted in a more secure environment on the web server 22. This is beneficial over conventional encryption which stores the authenticating data on the user's computer, which allows a malicious person to try to break any protection and have access to the user credentials, e.g., by breaking or cracking the protection algorithm over time. It is understood that a network such as an internet connection is required to authenticate to the web server 22 so that the login credentials stored on the web server 22, instead of the user's computer 16, can be verified and to help keep the password(s) safe from hackers and spyware if the computer 16 is compromised.

Once the user 12 is notified of all connected applications 14 and the key is sent (act 102), a wait state (block 104) can be entered followed by the message processor 38 (FIG. 2A) determining the requested action that is received from the program user interface, shell extension(s), and/or Office application(s). The file(s) 30 can be processed by encrypting, decrypting, and/or opening an unencrypted file (See FIGS. 2B and 2C).

Remote deletion 26 implements automatic deletion of encrypted files 30 when a reported lost or stolen computer 16 is connected to the internet. The user 12 can have the computer 16 marked as lost, stolen, or otherwise compromised, e.g., by calling a support center and providing user credentials and/or secret answers(s). Once activated, remote delete 26 will delete all encrypted files from a hard drive and/or storage device substantially immediately upon connection to the internet. The compromised computer's 16 identification is automatically determined upon connecting to the internet. When connected to the Internet if it is determined that the computer 16 identification is marked as lost or stolen (at act 92) the files 30 will automatically be deleted. A list of files 30 for remote deletion is obtained (at act 106), e.g., these can include a list of encrypted files 30 on the hard drive. Optionally, the user 12 can additionally define other paths for being deleted from the stolen computer 16 (e.g., D:\My Documents, unencrypted files, and the like). If the number of files 30 to delete is determined to be greater than zero (at act 108), the file 30 will be deleted (at act 110). If it is determined that the file 30 was successfully deleted (at act 112), a report 114 is sent to the web server 22 confirming that the file 30 was successfully removed. If it is determined that the file 30 was not successfully deleted (at act 112), a report 116 is sent to the web server 22 confirming that the file 30 was not successfully removed, and deletion is again attempted. The remote delete continues until the number of files 30 to remove is zero.

It is understood that if a user 12 used their credentials for more than one computer 16, the user 12 can identify which computer ID 16 should be marked for 'Remote Delete'. After a predetermined period of time, the user 12 that reported the computer 16 as lost or stolen can receive a report of the files 30 that were removed from the computer 16. It is understood that the web server 22 does not automatically keep, store, copy or have access to the encrypted files. In the event the encrypted documents were backed up, e.g., backed up on a flash drive, the user 12 can decrypt them once the user 12 contacts the consultant to connect the user 12 account with a new computer 16.

By way of non-limiting example, if a user's 12 smartphone is stolen the 'Remote Delete' process can remotely delete all text messages, contacts, emails, and the like that are on the compromised smartphone. Any backed-up encrypted documents can be recovered and selectively decrypted when the user 12 gets a new smartphone.

Figure 3:
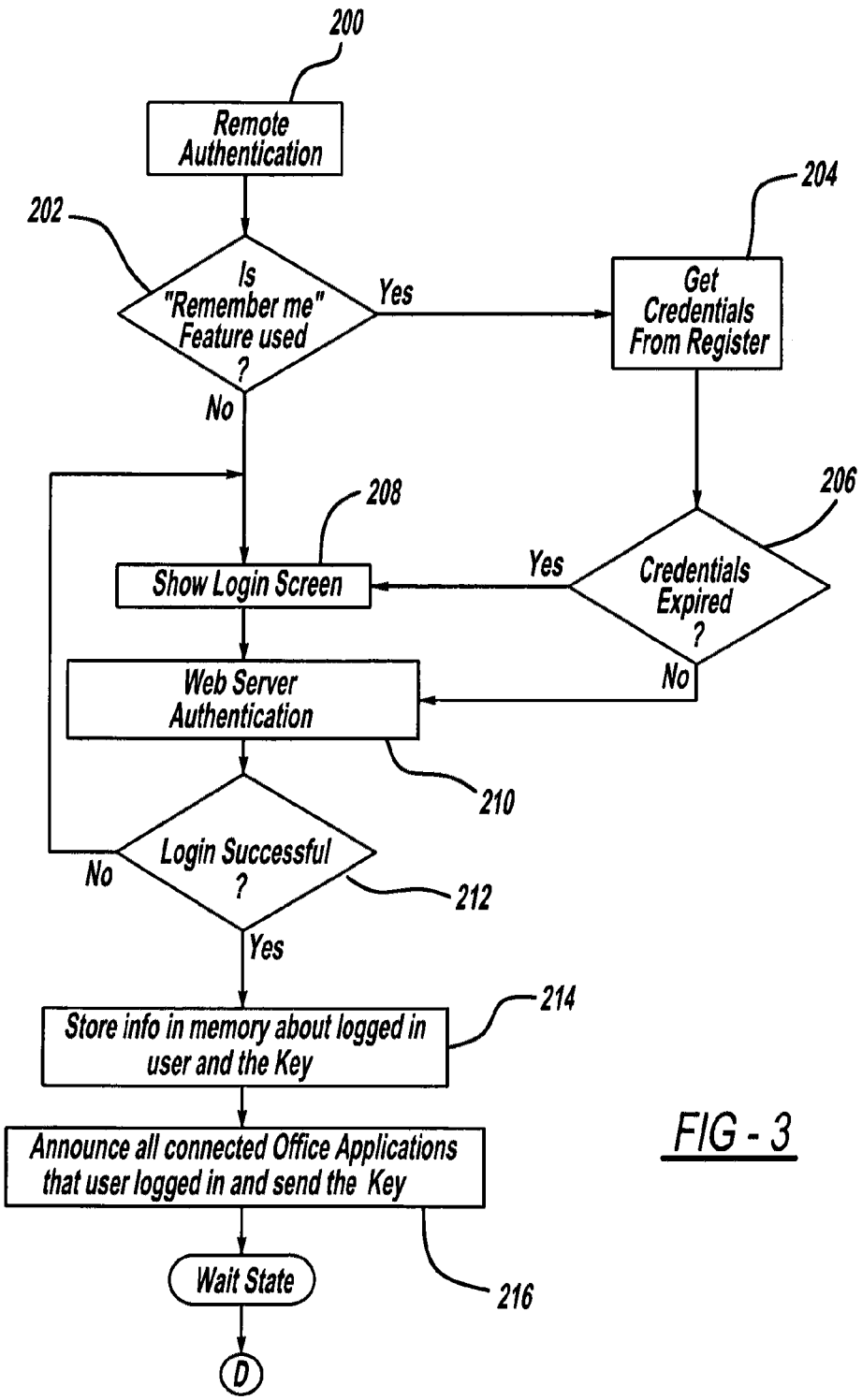
FIG. 3 is a schematic illustration of a flowchart illustrating primary processing steps of a remote authentication process, in accordance with another embodiment of the present invention.

Referring to FIG. 3, there is shown a portion of a flowchart illustrating the optional 'remember me' feature which can save the user's 12 credentials and use them for a predetermined amount of time, e.g., the current day for remote authentication (block 200). If the 'remember me' feature is determined to be in use (at act 202), the user's 12 credentials are obtained from a registry 204, e.g., a Windows registry. Preferably, the user's credentials and login date and/or time are selectively stored and obtained from the web server 22. If the credentials are determined to be expired (at act 206), the user logs in on the login screen (at act 208) using the user's credentials and the web server 22 authenticates the information using the database (at act 210). If it is determined that the login was not successful (at act 212), the user is directed back to the login screen (act 208). If the credentials are determined not to be expired (act 206), the web server 22 authenticates the information using the database (210). If the login is determined to be successful (act 212), the logged in user 12 and key information, e.g., encryption key and/or decryption key, can be stored in the memory (at act 214), and the user 12 is notified of all connected applications, e.g., Office Applications, that the user 12 logged in and the web server 22 sends the user 12 the key (at act 216). A wait state 214 is entered after authentication, and if remote deletion 26 was not required, e.g., the computer was not reported as stolen, the message processor 38 determines the requested action as explained above in greater detail.

Figure 4:
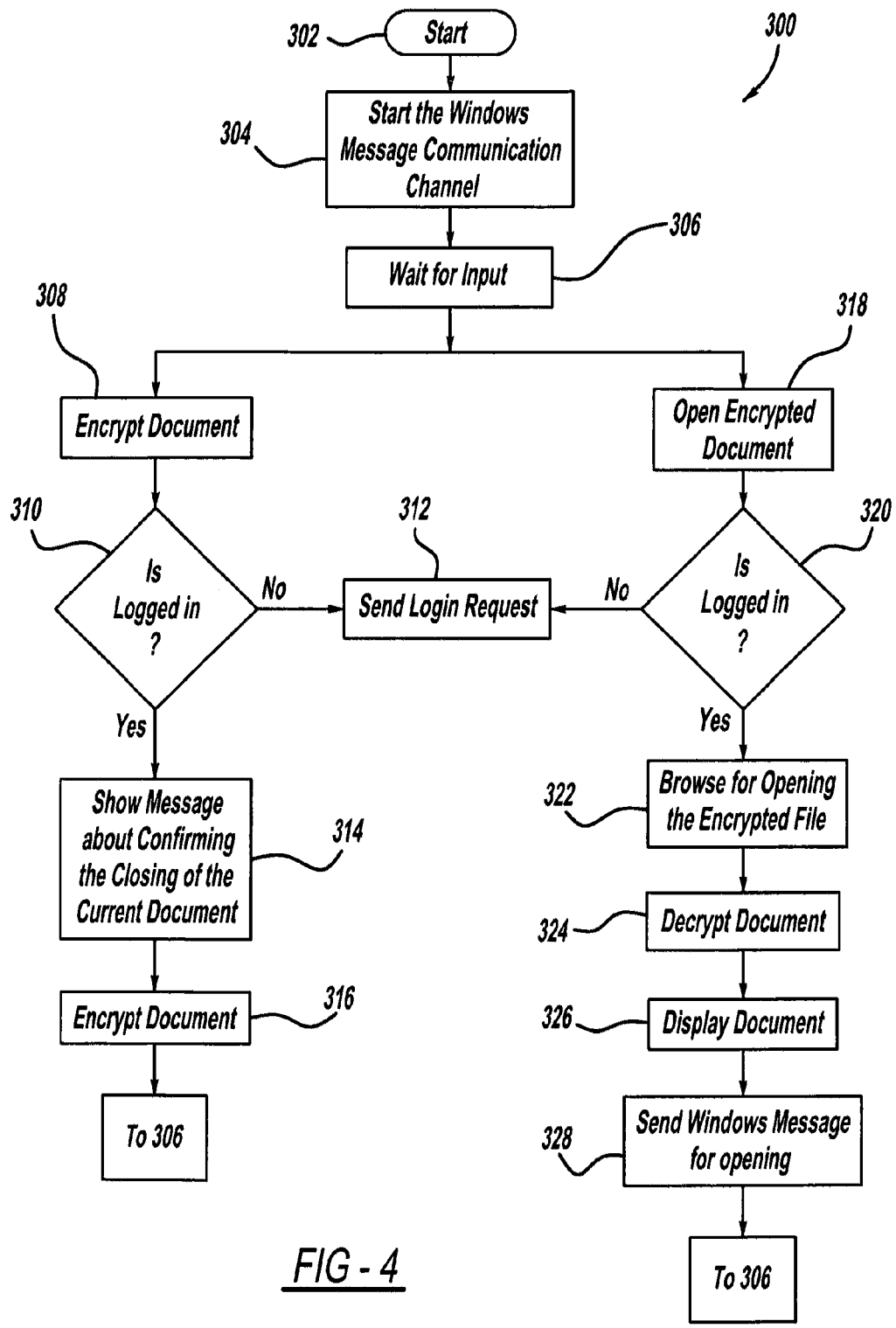
FIG. 4 is a schematic illustration of a flowchart illustrating primary processing steps of a document encryption and decryption system, in accordance with another embodiment of the present invention.

FIG. 4 shows a flowchart illustrating the steps performed when encrypting and/or decrypting and opening files, e.g., documents, for a Word, Excel, and/or PowerPoint Plug-in or Add-in that will automatically load when the application 14 is opened for additional functionality (block 302), generally shown at 300. A Windows message communication channel is started (at block 304) for processing messages, e.g., converting, and/or reading, and/or writing, and/or authenticating, and the like processing of messages from the network, and waits for input (at block 306) on what processing is requested. By way of non-limiting examples, a user working on a document can request document encryption or browse for encrypted documents in the storage device and/or network. If it is desired that the document be encrypted (block 308) and it is determined that the user is not logged in (at act 310), a user's login request is sent (at act 312) to the web server 22 for remote authentication, as set forth in greater detail above.

If it is determined that the user is logged in (act 310), a message is shown notifying and confirming that the current document will close (at act 314). The document is then encrypted (at act 316). The windows message communication channel (block 304) remains active and waits for additional input (block 306). If a document is already encrypted and the user desires to open the encrypted document (block 318) and if it is determined that the user is not logged in (at act 320), a login request is sent (act 312) to the web server 22 for remote authentication, as set forth in greater detail above. If it is determined that the user is logged in (act 320), the user can browse for the encrypted document (at act 322) to open. The document is then decrypted (at act 324). The document is displayed to the user (at act 326) and a Windows message is sent for opening the document (at act 328) in human-perceivable or readable form. The windows message communication channel (block 304) remains active and waits for additional input (block 306).

Figure 5B:
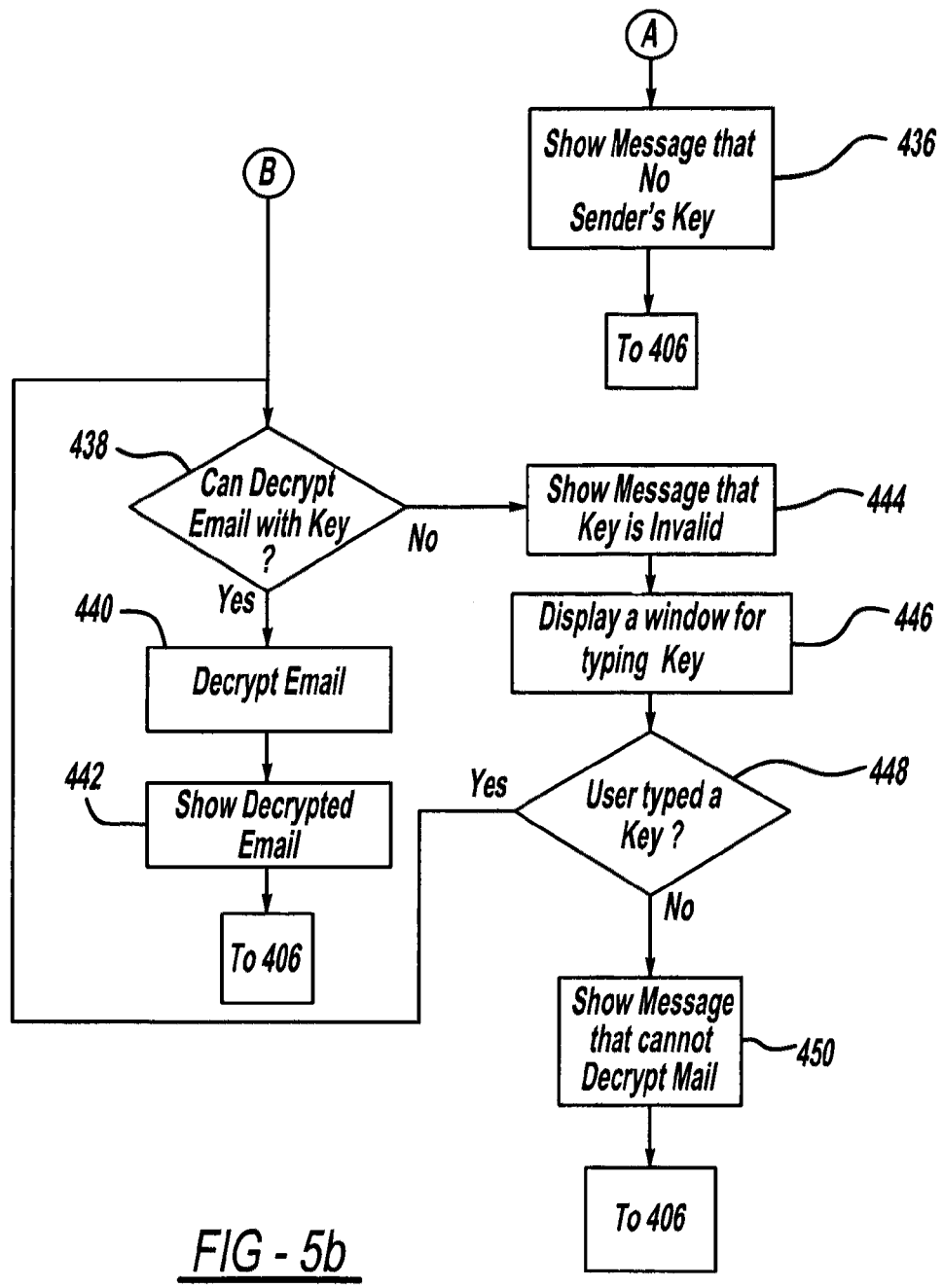
FIG. 5b is a schematic illustration of a portion of a flowchart illustrating primary processing steps of an electronic mail encryption and decryption system, in accordance with another embodiment of the present invention.

FIGS. 5a and 5b depicts a flowchart illustrating the steps when encrypting, decrypting, and/or opening files, e.g., email (s) and/or attachment(s), for a Microsoft Outlook Plug-in, generally shown at 400. The process begins and goes through the remote authentication 24 and remote deletion 26 processing steps, as set forth in greater detail above, and moves to start block 402 shown in FIG. 5. A Windows message communication channel is started (at block 404) for processing messages, e.g., converting, and/or reading, and/or writing, and/or authenticating, and the like processing of messages from the network, and waits for input (at block 406) on what processing is requested. By way of non-limiting examples, a user may wish to encrypt a newly drafted email for sending securely. If it is desired that the email be encrypted (block 408) and if it is determined that the user is not logged in (at act 410), a login request is sent (at act 412) to the web server 22 for remote authentication, as set forth in greater detail above, and the email is added to the processing queue (at act 414) for encryption. Once it is determined that the user is logged in (act 410) and if it is determined that the email is already encrypted (at act 416), a message is shown that the email is encrypted (at act 418). The windows message communication channel (block 404) remains active and waits for additional input (block 406). If the user is logged in (act 410) and if it is determined that the email is not already encrypted (act 416), the email content and attachments are encrypted (at act 420) and a message is shown that the requested email encryption has been completed (at act 418). The windows message communication channel (block 404) remains active and waits for additional input (block 406).

If a user desires to decrypt and view an email (block 424) and if it is determined that the user is not logged in (at act 426), a login request is sent (at act 412) to the web server 22 for remote authentication, as set forth in greater detail above, and the email is added to the processing queue (at act 414) for encryption. Once it is determined that the user is logged in (act 426) and if it is determined that the email is not encrypted (at act 428), a message is shown that the email is not encrypted (at act 430). If it is determined that the user is logged in (act 426) and if it is determined that the email is encrypted (act 428) and if it is determined that the sender did not send a key (at act 434), a message is displayed that there is no sender key to decrypt 436. If it is determined that the user is logged in (act 426) and if it is determined that the email is encrypted (act 428) and if it is determined that the sender did send a key (at act 434), then the key is used or applied to try to decrypt the email and/or attachments. If it is determined that the email cannot be decrypted with the key (at act 438), a message is displayed that the key is invalid (at act 444) and a window is displayed for selectively typing in a key (at act 446). If it is determined that the user did not type in a key (at act 448), a message is displayed that the email cannot be decrypted (at act 450) and the process moves to the wait state (at 406). If it is determined that the user did type in a key (at act 448), then it is determined whether or not the email can be decrypted with the key (act 438), e.g., with the key sent by the sender and/or with the key manually typed in at act 448. If it is determined that the email can be decrypted with the key (act 438), the email is decrypted (at act 440) and the decrypted email is displayed (at act 442). The process moves to the wait state (at 406) for additional requests to perform actions.

Figure 6:
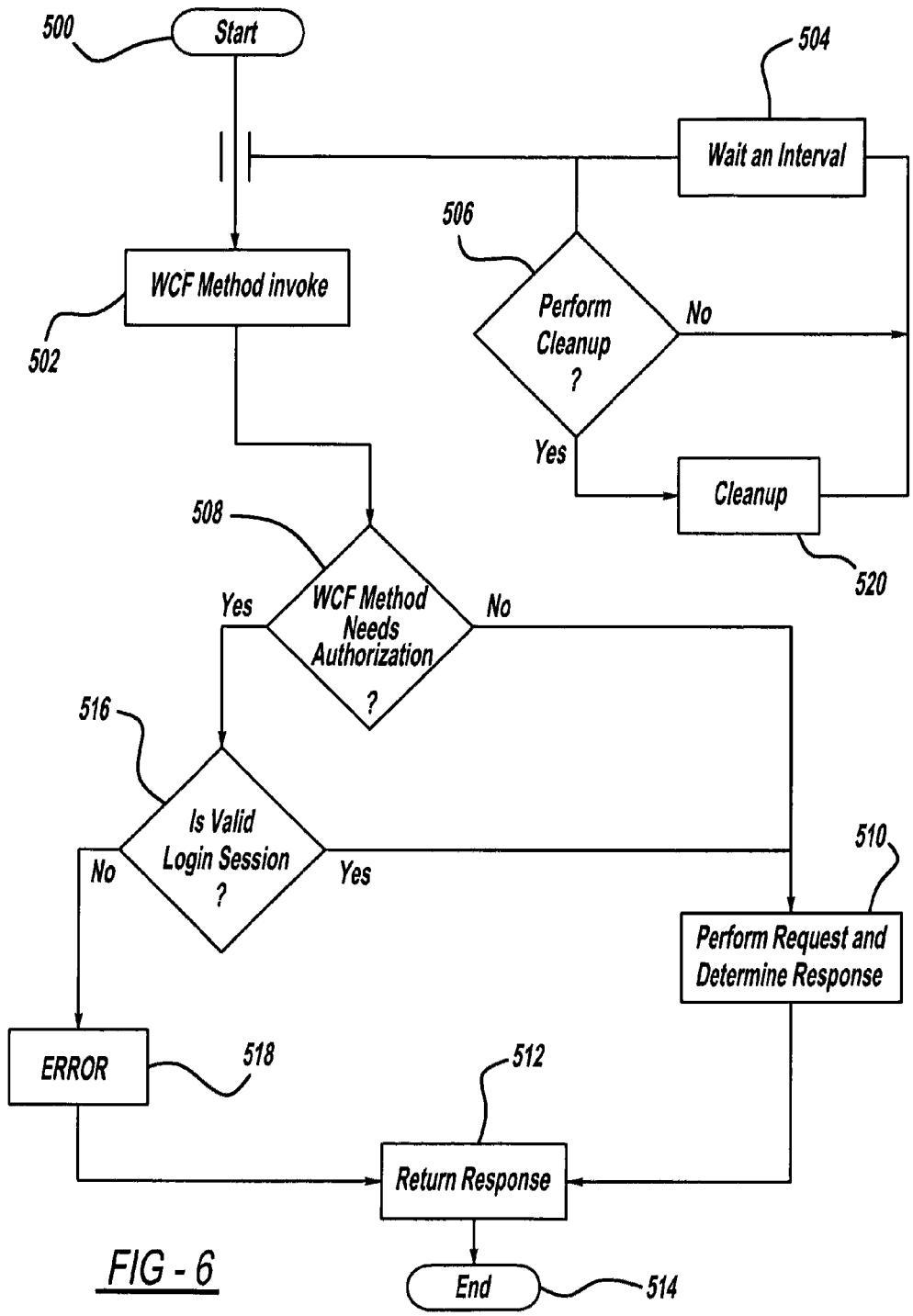
FIG. 6 is a schematic illustration of a flowchart illustrating primary processing steps of a Windows Communication Foundation service for remote authentication, in accordance with another embodiment of the present invention.
Figure 7:
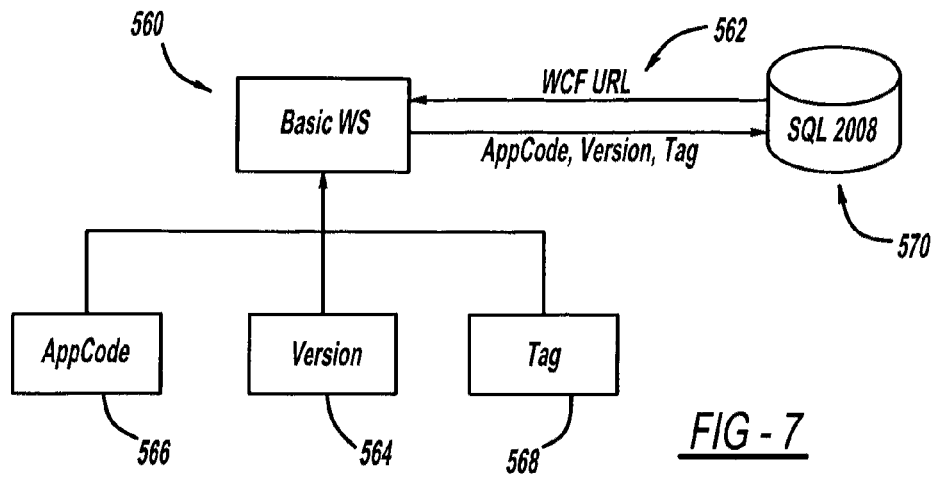
FIG. 7 is a schematic illustration of a flowchart illustrating primary processing steps of a Windows Communication Foundation service for remote authentication, in accordance with another embodiment of the present invention.
Figure 8:
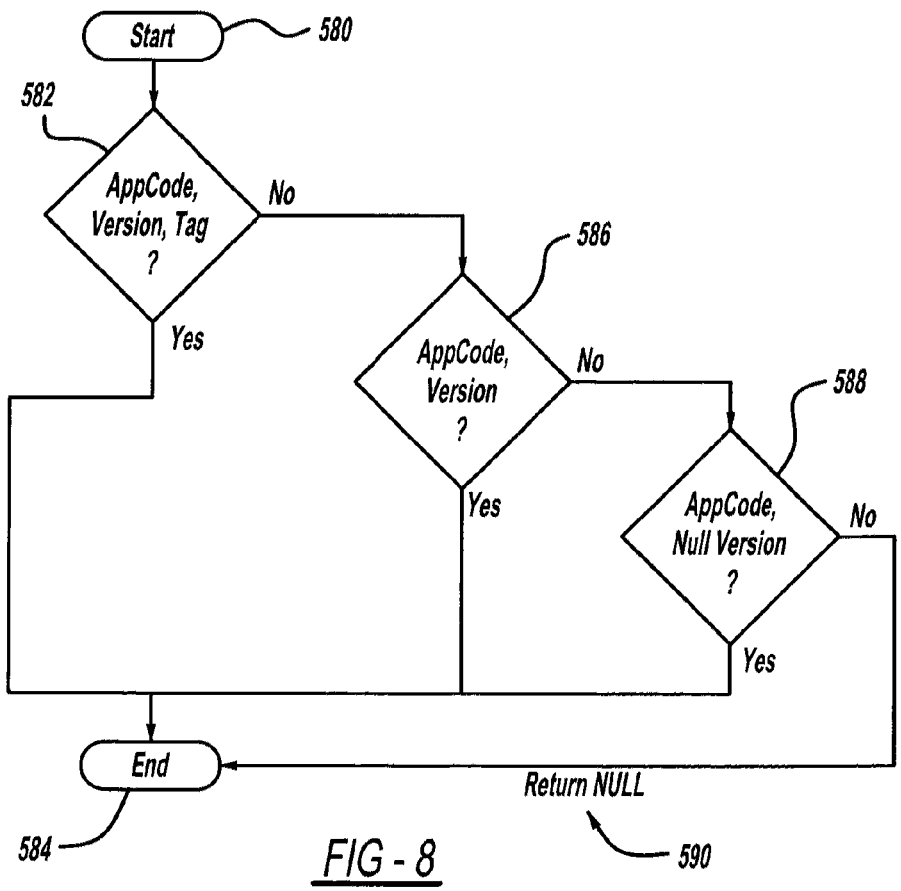
FIG. 8 is a schematic illustration of a flowchart illustrating primary processing steps of a Windows Communication Foundation service for remote authentication, in accordance with another embodiment of the present invention.

Referring to FIGS. 6-8 generally, there is shown a flowchart illustrating a process for establishing the web server connection 22 between at least the computer 16 and web server 22 to implement remote authentication 24 using a Windows Communication Foundation ("WCF") service, in accordance with certain embodiments of the invention. Generally, this process is implemented before traffic is allowed to get through such that the remote connection must be authorized before there is access to the web server 22. Typically, the WCF service is used to authenticate users with the encryption key and login process stored and processed by the web server 22 through WCF. Typically, the WCF service and computer ID can be used to identify and remote delete a compromised computer. Typically, the remote authentication and WCF service can be used to encrypt and/or decrypt. The process starts, shown as block 500, and moves to a parallel process wherein a WCF method is invoked (at act 502), e.g., Basic WCF Service, and a cleanup process is performed starting at act 506. Generally, the web server 22 validates user logins. Typically, every time a user requests that an action be performed, e.g., email encryption, the web server 22 must authenticate the users 12 login and/or the user 12 has to re-establish the connection, e.g., internet connection, and be re-authenticated, e.g., the user 12 must re-instate their login if timed out. Preferably, the user's authentication credentials are stored and processed by the web server 22 every time a request is made such that credentials, e.g., username and password, are not held locally on the computer 12 and authentication is processed every time a user wants to perform an action, e.g., encrypt a file. This is a significant benefit over conventional arrangements that allow caching of credentials locally, and ongoing connections, which can be retrieved by computer hackers, e.g., using hacker-based software. Generally, the WCF service connection is an application programming interface (API).

The cleanup process 106 enables a user 12 to "cleanup" an invalid entry during authentication. By way of non-limiting example, if a user enters an invalid username the web server 22 can establish what the login error is and communicate the defect to the user, e.g., notify the user that the username and/or password is invalid. If it is determined that a cleanup is required (at act 506), the cleanup is performed (at act 520) prior to waiting a predetermined interval (block 504) to determine if additional cleanup is necessary. If it is determined that no cleanup is required (act 506), wait an interval begins, shown at block 504.

The WCF method is invoked (act 502) as an application programming interface (API) not local to the user computer 16. If it is determined that the WCF method does not need authorization (at act 508), the requested action is performed and a response is determined (at act 510). The response is then given (at act 512), e.g., encryption complete, and the process is moved to end block 514. If it is determined that the WCF method needs authorization (act 508) and the user inputs a valid login (at act 516), the requested action is performed and a response is determined (at act 510). The response is then given (at act 512) and the process moves to end block 514. If the login session is not determined to be valid (act 516), an error message is issued (at block 518) and response is given (act 512), and the process moves to end block 514. The WCF Service can be used to authenticate users 12 with authentication processes, e.g., with an encryption key and login process, stored and processed by the web server 22 through the WCF based up predetermined verification parameters.

Referring to FIGS. 7 and 8 generally, the WCF service is an API in a .NET function or framework, e.g., Microsoft .NET framework, for guiding connections to selectively restrict or allow communications with the web server 22 in order to allow encrypting and/or decrypting of files is illustrated, in accordance with certain embodiments. The Basic WCF Service, shown generally at 560, is a process that guides the applications that are part of the system to communicate with the proper WCF Service. Thus, the Basic WCF Service does not handle the communication per se, but instead tells an application which URL to use. Generally, the first call made by the application is to the Basic WCF Service 560. Typically, this is a non-continuous onetime process, e.g., and/or for a predetermined period of time, unless the user 12 changes the address from the settings section. The Basic WCF Service 560 will return the WCF uniform resource locator (URL) of the main WCF Service, shown generally at 562. This is beneficial when there are users running an old version, e.g., program versions, and also users running newer or latest versions. The Basic WCF Service 560 can take the current application version 564 and the application code 566, which can be unique per application and not per version, and also optionally a tag 568 to identify the WCF Service that can communicate with them. A benefit of the Basic WCF service is to guide an application to use the service that works for it, e.g., rather than having to overwrite the service if modifications are made to the service. If any changes are made on the web server 22 side, both old and the latest applications can be used. Preferably, the Secured Query Language (SQL) is SQL 2008, shown generally at 570.

Referring to FIG. 8 generally, there is shown a flowchart illustrating the process of returning the WCF URL. Typically, for any application that the Basic WCF Service does not find a match between AppCode and version, the Basic Service will return NULL when no match can be found. It is understood that the application can try to use the default service URL. Beginning at start 580, if it is determined that the AppCode, Version, and Tag operably matches (at act 582), the process moves to end block 584. If it is determined that the AppCode, Version, and Tag do not match (act 582) to predetermined parameters, but that it is determined that AppCode and Version operably match (at act 586), the process moves to end block 584. If it is determined that the AppCode, Version, and Tag do not match (act 582) and it is determined that AppCode and Version do not match (act 586), and if it is determined that is AppCode Null Version, e.g., Null version that matches all for which a version cannot be matched with a version column, the process moves to end block 584. If it is determined that the AppCode, Version, and Tag do not match (act 582) and it is determined that AppCode and Version do not match (act 586) to predetermined verification parameters, and if it is determined that is not AppCode Null Version, a Return NULL is made, shown generally at 590 and the process moves to end block 584 and access can be granted.

By way of non-limiting example, to identify and remote delete a lost or stolen computer, the WCF and gathered hardware ID can be used. By non-limiting example, the process of using the remote authentication and WCF service can be used to encrypt and decrypt files, e.g., on mobile devices.

Figure 9A:
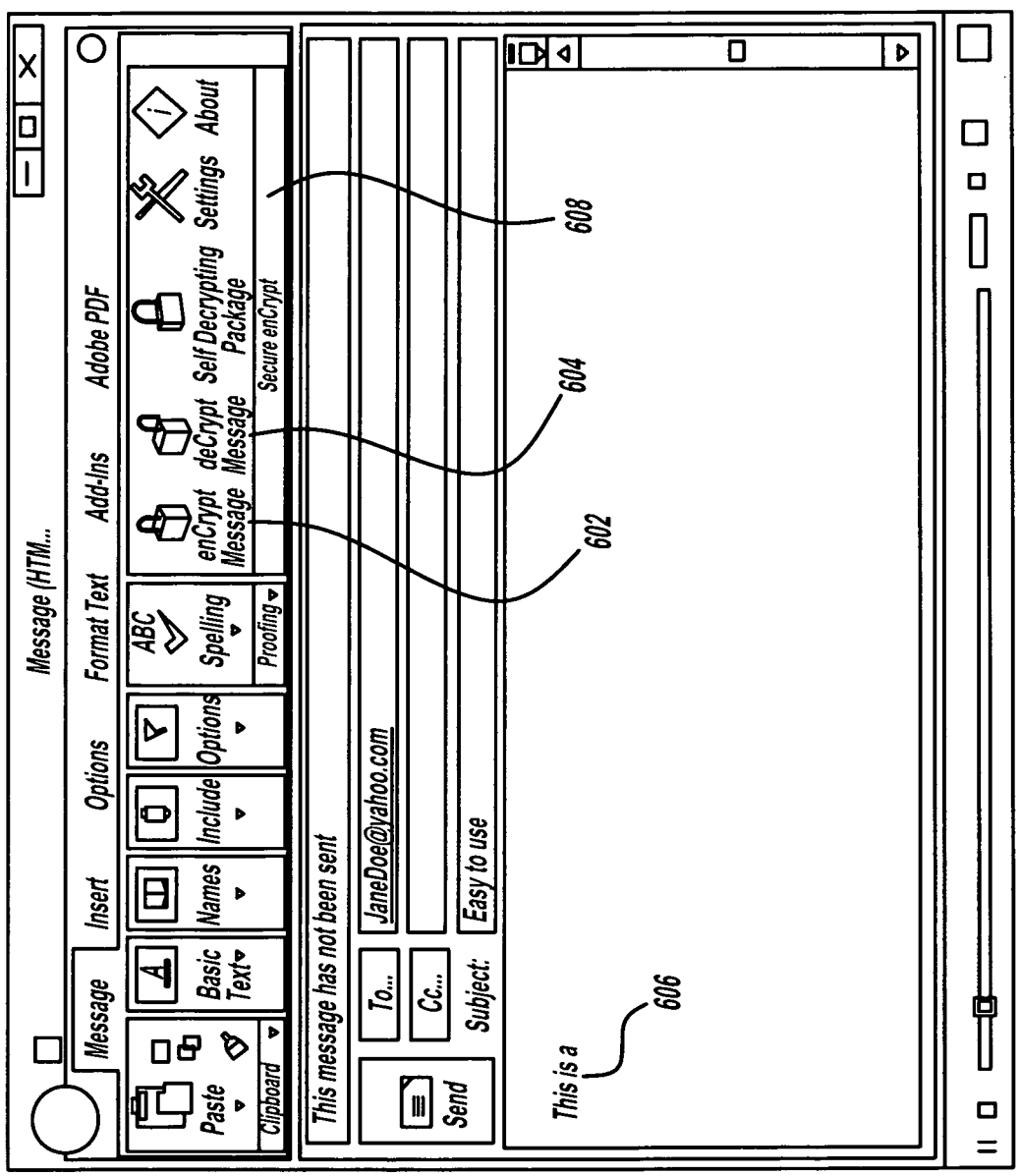
FIG. 9A is a screen capture illustrating an example of an encrypt key and decrypt key of an electronic mail message that may be used to implement certain embodiments of the invention in accordance with the present invention.
Figure 9B:
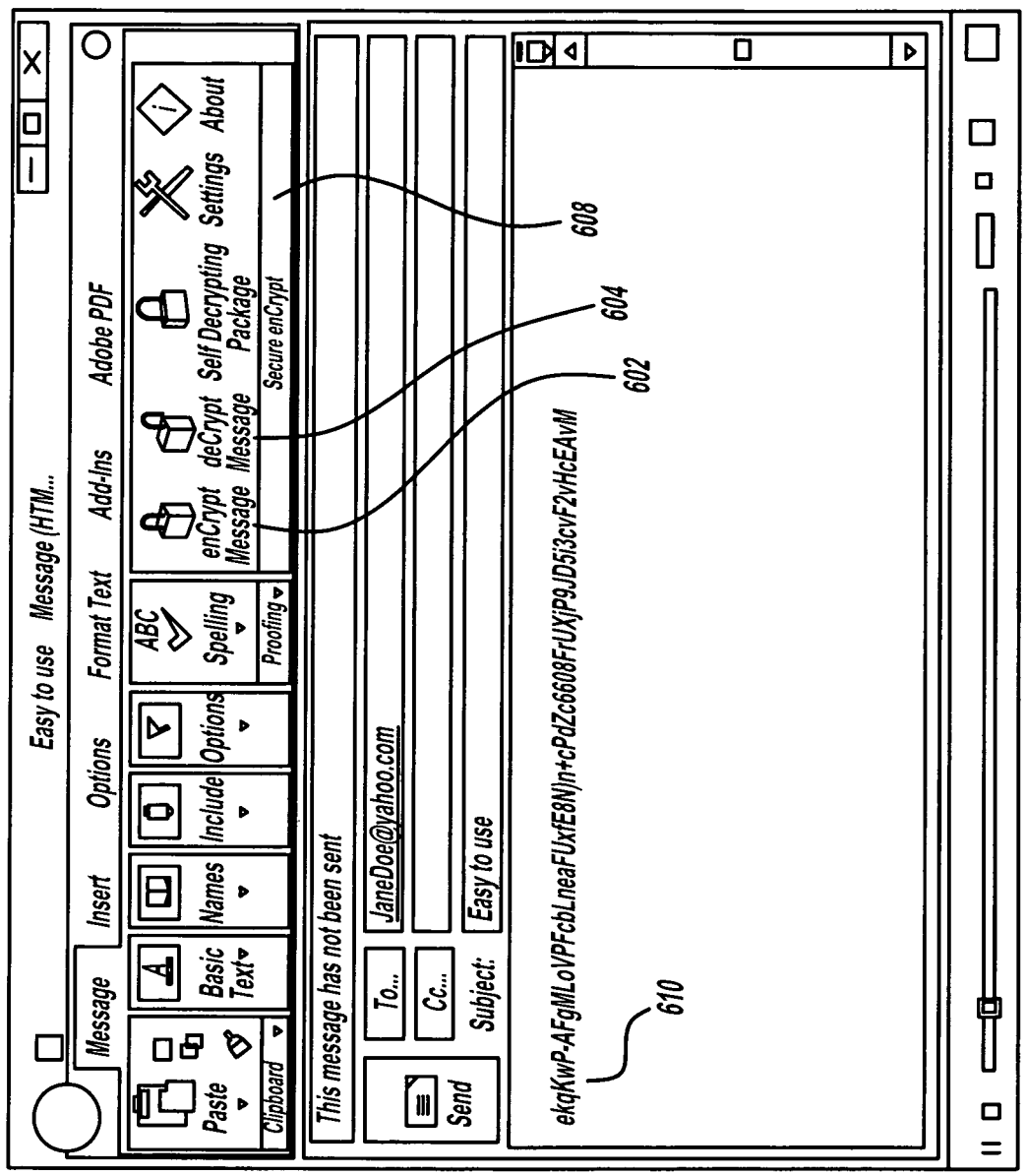
FIG. 9B is a screen capture illustrating an example of an encrypt key and decrypt key of an encrypted electronic mail message that may be used to implement certain embodiments of the invention in accordance with the present invention.

FIGS. 9A and 9B are screen captures of an exemplary Microsoft Office email message, shown generally at 600, having a clickable encrypt key 602 ("enCrypt Message" button) and a decrypt key 604 ("deCrypt Message" button) for a user's selective encryption and decryption of emails and/or attachments. To encrypt an email in Microsoft Outlook, a user can open a new email message 600, type in their contact, subject, and/or message 606 in the spaces provided, and then simply click the encrypt key 602 in the toolbar 608. The message 606 will turn into an encrypted message 610 (shown in FIG. 9B) comprising a series of letters, numbers, symbols, and combinations thereof to help secure its content from an unauthorized party. The encrypted message 610 will be unreadable as it can be placed as an encrypted attachment until decrypted. The user can then send the email message 600 and include their unique encryption key to allow the user's receiving party to decrypt the message. It is understood that attachments can also be encrypted and sent in the email message 600, e.g., with a single click a user can encrypt emails including attachments. It is further understood that the encrypt key 602 and/or decrypt key 604 can be saved for future use, e.g., saved in Microsoft Outlook in the email contacts listing.

Figure 10:
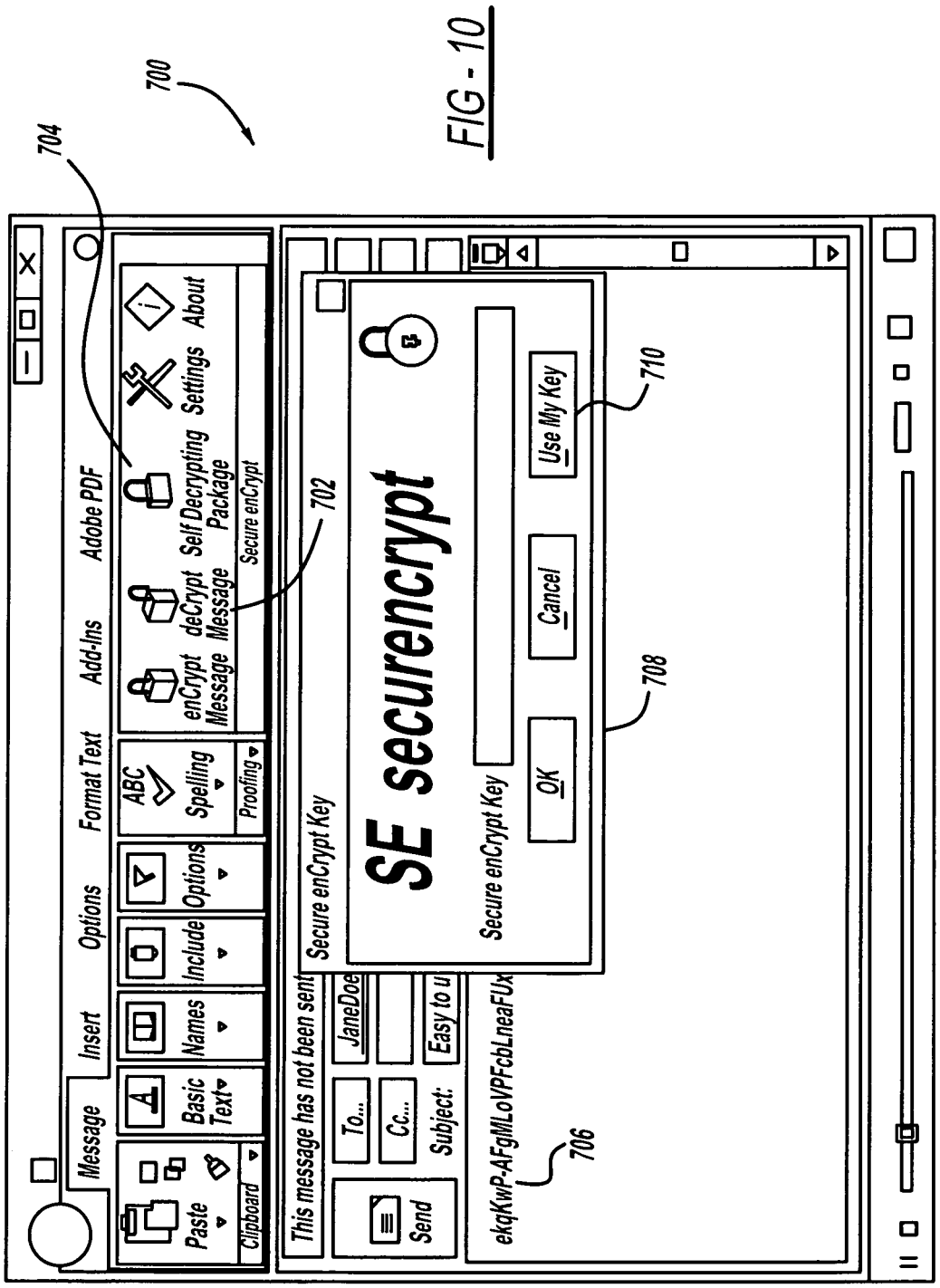
FIG. 10 is a screen capture illustrating an example of an encryption key prompt in an encrypted electronic mail message that may be used to implement certain embodiments of the invention in accordance with the present invention.

FIG. 10 is a screen capture of an exemplary Microsoft Office encrypted email message, shown generally at 700, including a clickable decrypt key 702 ("deCrypt Message" button) for selective decryption of emails, e.g., self decrypting packages. To decrypt an email in Microsoft Outlook, a user can open the encrypted email message 700 and click the decrypt key 702 in the toolbar 704, which can generate a prompt 708. The prompt 708 allows the user to select the "UseMy Key" option, shown at 710, to decrypt the encrypted email message 700, e.g., the prompt 708 can include the unique encryption key sent by the user. The encrypted message 706, including attachments, will turn into a decrypted message in human-readable or perceivable form. It is understood that the encrypt key and/or decrypt key can be saved, e.g., saved in Microsoft Outlook in the email contacts listing, for future use. This can save the encryption key 702 and/or decryption key 702 provided with that contact allowing a user to decrypt emails from that email address saved with that contact. The receiving party can also download from a server a decryption system to allow the receiving part to decrypt and read the email using the user's encryption key they sent to the receiving party in the email message.

Figure 11:
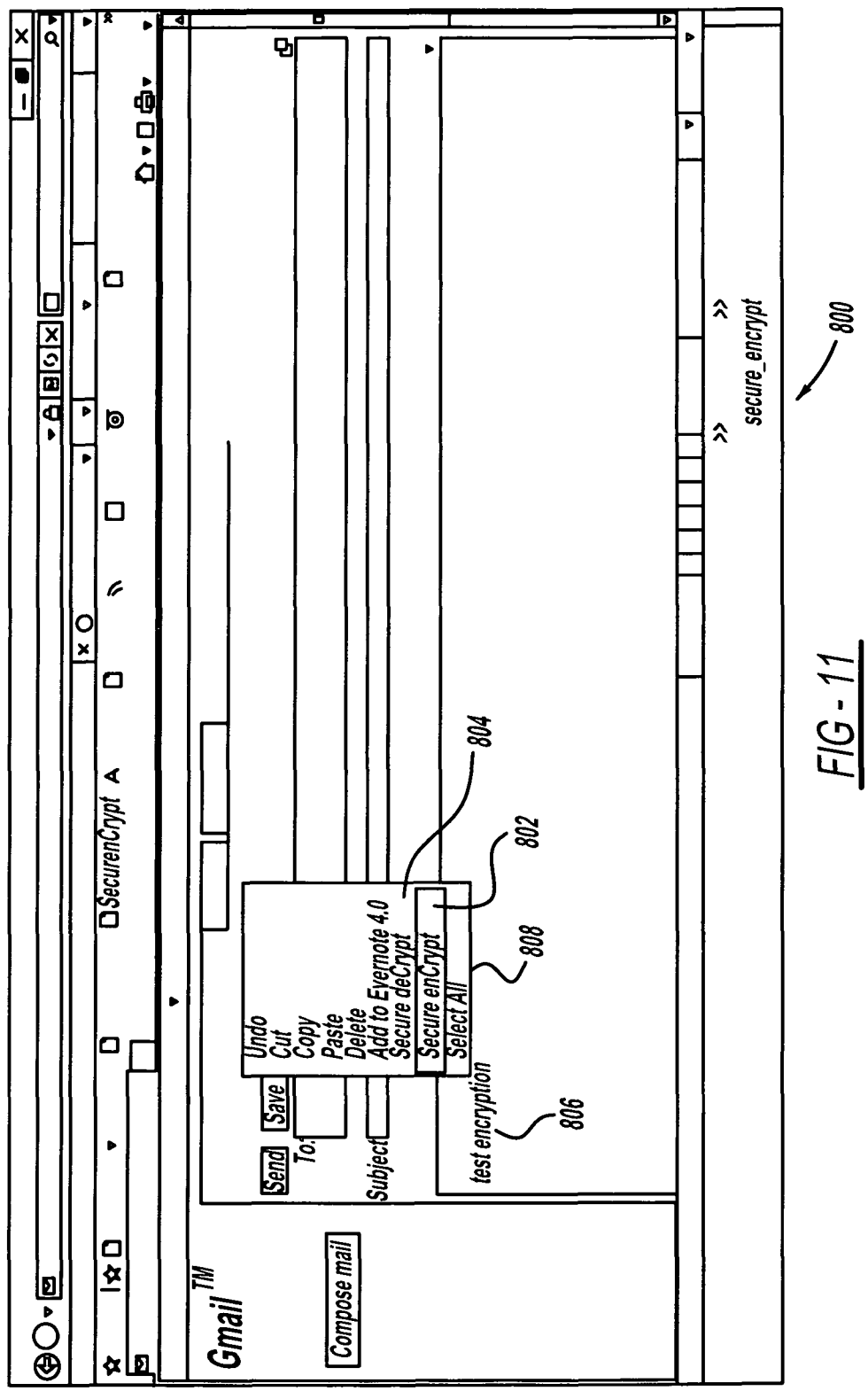
FIG. 11 is a screen capture illustrating an example of an encrypt key and decrypt key of an electronic mail message that may be used to implement certain embodiments of the invention in accordance with the present invention.

FIG. 11 is a screen capture of an exemplary Internet Explorer GMail email message, shown generally at 800, having a clickable encrypt key 802 ("Secure enCrypt") menu option and a decrypt key 804 ("Secure deCrypt") option for a user's selective encryption and decryption of emails and/or attachments. To encrypt an email in Internet Explorer, a user can open a new email message 800, type in their contact, subject, and/or message, shown generally at 806, in the spaces provided, and then simply click the encrypt key 802 in the toolbar and/or menu 808. The message 806 will turn into an encrypted message comprising a series of letters, numbers, symbols, and combinations thereof to help secure its content from an unauthorized party. The encrypted message will be unreadable as it can be placed as an encrypted attachment until decrypted. The user can then send the email message 800 and include their unique encryption key and/or unique decrypt key to allow the user's receiving party to decrypt the message. It is understood that attachments can also be encrypted and sent in the email message 800, e.g., with a single click a user can encrypt emails including attachments. It is further understood that the encrypt key and/or decrypt key can be saved for future use, e.g., saved in Gmail, Yahoo, and the like email contacts listing.

Referring to the Figures in general, the exclusive encryption system 10 can be usable to anyone with basic computer skills to use powerful encryption, e.g., AES 256 Bit encryption with a single-click, AES robust encryption, and the like. By non-limiting example, with a single-click a user can select encryption of files and folders they want to encrypt. Thus, the encryption system 10 is much easier to use than conventional encryption that is complicated, time consuming and difficult to use. Although the program can be more simply installed and easier to use than conventional programs, powerful protection is provided, e.g., provided using AES 256-bit robust encryption standards adopted by the National Institute of Standards and Technology. An additional benefit is the decrease in training time, such that a user (and/or employer) experiences minimum training and easier implementation.

The encryption system 10 can use links, ribbons, widgets, and the like, and combinations thereof, to improve user interface, e.g., to provide a user-friendly interface allowing easy "one-click" encryption by a user 12 clicking an encryption key located in the toolbar of an application. By way of non-limiting example, an encryption key of the encryption system 10 can be embedded or integrated into the menu toolbar of Microsoft Office allowing a user 12 to click the encryption key to encrypt the email message and attachments before transmitting it to a second party. Additionally, by non-limiting example, a user 12 can compress a smartphone button to chose encryption to encrypt a text message for sending or select an encryption button on a smartphone touch screen, e.g., touch an encryption button on a Motorola Droid™ touch screen.

It is further contemplated that self decrypting can be used wherein files are compressed and encrypted with a password. The files can be reduced (made smaller) in size so that they can be sent securely via email or stored in another location, e.g., a zip or flash drive. This is particularly beneficial if the user 12 is travel and/or will not have access to the internet to ensure that the files will be encrypted while on the go. When the user 12 wants to access the encrypted information, the user 12 enters the user password(s). Self decrypting can also be used to selectively send "a package" of encrypted files/folders to anyone. Self decrypting packages are zipped and then encrypted. The intended recipient of the package, e.g., party receiving the email with encrypted files, can decrypt the package using the password the user 12 entered when creating the package. By the user 12 providing the receiving party with the password, the second party will be able to decrypt the package and view the data.

The encryption system 10 can optionally use file encryption rather than full disk encryption. Full disk encryption is known to encrypt an entire hard drive which takes extensive time and space and the user could also experience a slowdown in normal computer processes. The encryption system 10 of the present invention allows a user 12 to choose which files, e.g., folders, documents, emails, text messages, and the like, are important to encrypt such that space is not taken on the hard drive and to give the user flexibility.

Storing customer, client, and patient information on a user's laptop or personal computer requires security of important, private information that will protect all electronic information and data. The encryption system 10 can help aid the user in compliance with privacy and confidentiality laws, service provider requirements, industry standards, customer/client/patient confidentiality, and any other type of Federal and State privacy/confidentiality laws and regulations, e.g., the Health Insurance Portability and Accountability Act (HIPAA), HITECH Act, Sarbanes-Oxley Act (SOX) ('Public Company Accounting Reform and Investor Protection Act'), the Visa Payment Card Industry Document Security Standards (VISA PCI DSS), Basel Accords (Basel II), and the like. By encrypting files 30 the user 12 improves protection of valuable data from being hacked, used, or accessed by anyone. In addition, the encryption system 10 does not use valuable system resources or take up additional hard drive space for encryption. The program can run quietly in the background without burdening the user's system resources. Running in the background of the user's computer also helps to keep their information private, protected and unreadable.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A computer-implemented method of creating encryption and decryption of a file in a computing device, said computer-implemented method comprising steps of:
   receiving a request from a user that an action be performed on a first computer;
   identifying said action requested by said user as encryption, decryption and/or opening of said file;
   retrieving user credentials and computing device identification of said first computer;
   transmitting said user credentials and said computing device identification for remote authentication of user access;
   comparing said user credentials and said computing device identification with stored credentials at a remote server component for authenticating said user credentials, and matching said user credentials and said computing device identification with said stored credentials at said remote server component;
   determining said user as authenticated;
   if said user is authenticated, applying an encryption key assigned to said authenticated user that is unique to said user and stored on said remote server component;
   processing said request of said authenticated user; and
   providing access to said authenticated user for a predetermined period of time to selectively proceed with requesting additional action(s) to be performed;
   wherein said method further comprises controlling remote deletion of said file, wherein said remote deletion comprises,
      receiving a user request to mark said computing device as compromised;
      storing identification of said computing device;
      generating a list of directories containing files for remote deletion;
      terminating access to remotely authenticate said identification of said computing device;
   retrieving said identification of said computing device automatically upon said computing device connecting to a network;
      comparing said identification of said computing device with said stored credentials on said remote server component;
      determining said computing device as compromised;
      marking said computing device as compromised;
      controlling remote deletion of all encrypted files and said list of directories containing files upon said compromised computing device connecting to said network; and
   reporting deletion of all encrypted files and said list of directories containing files as deleted.

2. The computer-implemented method of creating encryption and decryption of said file of claim 1, wherein said computer-implemented method further comprises retrieving and transmitting said identification of said computing device automatically and matching user inputted credentials and said identification of said computing device with said stored credentials on said remote server component.

3. The computer-implemented method of creating encryption and decryption of said file of claim 1, wherein said computer-implemented method further comprises transmitting said encryption key assigned to said user to a second computer for controlling access by a second user and applying decryption of said file on said second computer.

4. The computer-implemented method of creating encryption and decryption of said file of claim 1, wherein said computer-implemented method further comprises invoking a Windows Communication Foundation (WCF) service for authenticating said user by said remote server component through said WCF.

* * * * *

UNITED STATES PATENT AND TRADEMARK OFFICE
CERTIFICATE OF CORRECTION

| | | |
|---|---|---|
| PATENT NO. | : 8,621,214 B2 | |
| APPLICATION NO. | : 12/931770 | |
| DATED | : December 31, 2013 | |
| INVENTOR(S) | : Michael E. Johnson and Kenneth L. Wilson | |

It is certified that error appears in the above-identified patent and that said Letters Patent is hereby corrected as shown below:

On the Title Page,
Item [73], "Securencrypt, LLC" should be -- SecurenCrypt, LLC --.

In the Specification,
Column 1,
Line 23, "In" should be -- A --.

Column 6,
Line 17, "BlackBerry®" should be -- BlackBerry™ -- .

Column 6,
Line 17, "Android®" should be -- Android™ --.

Column 9,
Line 19, "answers(s)" should be -- answer(s) --.

Column 12,
Line 44, "up" should be -- upon --.

Column 13,
Line 23, insert -- it -- before "is".

Column 13,
Line 31, insert -- it -- between "that" and "is".

Column 14,
Line 8, delete "702" after -- encryption key --.

Signed and Sealed this
Ninth Day of September, 2014

Michelle K. Lee
*Deputy Director of the United States Patent and Trademark Office*

CERTIFICATE OF CORRECTION (continued)
U.S. Pat. No. 8,621,214 B2

Column 14,
Line 12, "part" should be -- party --.

Column 14,
Line 64, "chose" should be -- choose --.

Column 15,
Line 6, "travel" should be -- traveling --.